United States Patent
Kato et al.

(10) Patent No.: US 7,601,427 B2
(45) Date of Patent: Oct. 13, 2009

(54) CURABLE COMPOSITION, CURED FILM, ANTIREFLECTION FILM, POLARIZING PLATE AND LIQUID CRYSTAL DISPLAY

(75) Inventors: Shinya Kato, Minami-Ashigara (JP); Hiroyuki Yoneyama, Minami-Ashigara (JP); Naohiro Matsunaga, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 456 days.

(21) Appl. No.: 11/410,005

(22) Filed: Apr. 25, 2006

(65) Prior Publication Data

US 2007/0116970 A1    May 24, 2007

(30) Foreign Application Priority Data

Apr. 26, 2005   (JP) .................... P-2005-128219

(51) Int. Cl.
    *B32B 9/04*    (2006.01)
(52) U.S. Cl. .................... 428/447; 428/1.32; 428/1.55; 428/421; 428/451; 428/507; 525/477
(58) Field of Classification Search .................... None
    See application file for complete search history.

(56) References Cited

U.S. PATENT DOCUMENTS

2005/0181146 A1 *  8/2005  Yoneyama et al. ......... 428/1.31

FOREIGN PATENT DOCUMENTS

| JP | 2004294601 | * | 10/2004 |
| WO | 2004/046247 A1 | | 6/2004 |

* cited by examiner

*Primary Examiner*—Marc S Zimmer
(74) *Attorney, Agent, or Firm*—Buchanan Ingersoll & Rooney PC

(57) ABSTRACT

A curable composition is provided and contains (A) at least either a hydrolyzed product of organosilane or a condensation reaction product of the hydrolyzed product having a mass average molecular weight of from 500 to 10,000 in terms of ethylene glycol, (B) a fluorine-containing resin having a mass average molecular weight of 5,000 or more in terms of polystyrene, and a fluoroalkyl structure and a polysiloxane structure, and (C) a silane coupling agent represented by a prescribed formula or at least either a hydrolyzed product of the silane coupling agent or a condensation reaction product of the hydrolyzed product.

12 Claims, 4 Drawing Sheets

CURABLE COMPOSITION, CURED FILM, ANTIREFLECTION FILM, POLARIZING PLATE AND LIQUID CRYSTAL DISPLAY

FIELD OF THE INVENTION

The present invention relates to a curable composition and a cured film useful for forming an antireflection film excellent in durability. The invention further relates to an antireflection film excellent in durability formed from the curable composition and the cured film, a polarizing plate using the antireflection film on a protective film of a polarizer, and an image display device in which the antireflection film or the polarizing plate is disposed on an image screen.

BACKGROUND OF THE INVENTION

Antireflection films are generally arranged on the outermost surfaces of display devices such as cathode ray tube (CRT), plasma display (PDP), electroluminescence display (ELD), and liquid crystal display (LCD) so as to reduce reflectance by using the principle of optical interference for the purpose of preventing contrast reduction and mirroring of images by the reflection of outer light.

These antireflection films can be manufactured by forming a low refractive index layer having an appropriate thickness on the outermost surface of a support, and in some cases by forming arbitrarily a high refractive index layer, an intermediate refractive index layer, a hard coat layer and the like between a support and a low refractive index layer. As the materials of a low refractive index layer, materials having the lowest possible refractive index are desired from the viewpoint of realizing a low refractive index.

Since used at the outermost surface, antireflection films are required to have functions as the protective film of display devices, e.g., high transmittance, high physical strengths (scratch resistance, etc.), chemical resistance, a dust-proof property, an antifouling property, and weather fastness (moisture and heat resistance, light fastness, etc.) are required.

Since antireflection films are generally disposed on the outermost surface, they are required to have high scratch resistance and an antifouling property. The techniques of the improvement of scratch resistance by using a fluorine compound having a polysiloxane structure in a low refractive index layer are disclosed in WO 2004/046247 A1. However, it is difficult to obtain sufficient scratch resistance with only the techniques disclosed in these patents.

It is also difficult to obtain sufficient antifouling property.

SUMMARY OF THE INVENTION

An object of the invention is to provide a curable composition and a cured film capable of forming an antireflection film high in an antireflection property and excellent in scratch resistance and antifouling durability.

Another object of the invention is to provide an antireflection film having excellent properties as above, and to provide a polarizing plate and an image display device using the antireflection film.

As a result of earnest examination, the present inventor has found that the above objects of the invention can be achieved with an antireflection film and a polarizing plate having the structures shown below, and an image display device using the same.

1. A curable composition comprising:
    (A) at least one of a hydrolyzed product of organosilane and a condensation reaction product of the hydrolyzed product, the at least one of the hydrolyzed product and the condensation reaction product having a weight average molecular weight of 500 to 10,000 in terms of ethylene glycol;
    (B) a fluorine-containing resin having a weight average molecular weight of 5,000 or more in terms of polystyrene and having a fluoroalkyl structure and a polysiloxane structure; and
    (C) at least one of a silane coupling agent represented by formula (1), a hydrolyzed product of the silane coupling agent and a condensation reaction product of the hydrolyzed product:

    $$(R^a)_m—Si(X^a)_{4-m} \tag{1}$$

wherein $X^a$ represents a hydroxyl group or a group capable of hydrolysis; $R^a$ represents a substituent having at least one of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, and an acylamino group; and m is an integer of 1 to 3.

2. The curable composition as described in the item 1, wherein the organosilane in (A) is a compound represented by formula (2):

    $$(R^b)_m—Si(X^b)_{4-m} \tag{2}$$

wherein $X^b$ represents a hydroxyl group or a group capable of hydrolysis; $R^b$ represents an unsubstituted alkyl group or an unsubstituted aryl group; and m is an integer of 0 to 3.

3. The curable composition as described in the item 1 or 2, wherein $R^a$ is a substituent having at least one of an epoxy group, an acyloxy group and an acylamino group.

4. The curable composition as described in any one of the items 1 to 3, wherein $R^a$ is a substituent having an acryloyloxy group.

5. The curable composition as described in any one of the items 1 to 4, wherein the curable composition comprises (D) inorganic fine particles having an average particle size of 5 to 100 nm.

6. The curable composition as described in the item 5, wherein the inorganic fine particles (D) have pores having an average pore diameter of 0.01 to 90 nm in an inside or on a surface thereof.

7. The curable composition as described in any one of the items 1 to 6, which has a fluorine content of 5 to 60 weight%.

8. The curable composition as described in any one of the items 1 to 7, which further comprises a crosslinkable compound and an acid generator.

9. A cured film obtained by curing a curable composition as described in any one of the items 1 to 8 upon at least one of heating and ionizing radiation.

10. An antireflection film comprising: a transparent support; a hard coat layer; and an antireflection layer in this order, wherein
    the hard coat layer is a cured film formed from a curable composition comprising: a resin composition curable upon at least one of heating and ionizing radiation; and at least one of a silane coupling agent represented by formula (1), a hydrolyzed product of the silane coupling agent and a condensation reaction product of the hydrolyzed product, and
    the antireflection layer is a cured film as described in the item 9:

    $$(R^a)_m—Si(X^a)_{4-m} \tag{1}$$

wherein $X^a$ represents a hydroxyl group or a group capable of hydrolysis; $R^a$ represents a substituent having at least one of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, and an acylamino group; and m is an integer of 1 to 3.

11. The antireflection film as described in the item 10, wherein the curable composition for forming the hard coat layer comprises a leveling agent.

12. The antireflection film as described in the item 11, wherein the leveling agent is at least one of a fluorine compound and a silicone compound.

13. The antireflection film as described in any one of the items 10 to 12, wherein the curable composition for forming the hard coat layer comprises a compound comprising a fluoro-aliphatic group-containing monomer represented by formula (3):

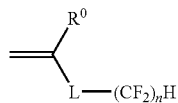

wherein $R^0$ represents a hydrogen atom, a halogen atom, or a methyl group; L represents a divalent linking group; and n represents an integer of 1 to 18.

14. The antireflection film as described in any one of the items 10 to 13, which has a photoelectron spectral intensity ratio Si/C at an outermost surface of 2 times or more than that at an 80% lower layer from the outermost surface.

15. The antireflection film as described in any one of the items 10 to 14, which has a haze attributable to surface light scattering of 3% or less and a glossiness at 60° of 60 to 120%.

16. The antireflection film as described in any one of the items 10 to 14, which has a haze attributable to surface light scattering of 3.5% or more and a glossiness at 60° of 20 to 80%.

17. The antireflection film as described in any one of the items 10 to 16, which comprises a transparent antistatic layer comprising an electrically conductive material, wherein the antireflection film has a surface resistance value logSR of 12 or less.

18. The antireflection film as described in any one of the items 10 to 17, wherein a critical load of a surface of the antireflection film in a rubbing test with a cotton swab after exposure to ozone of 10 ppm for 192 hours is 400 g or more.

19. A polarizing plate comprising: a polarizer; and two protective films, wherein at least one of the two protective films is an antireflection film as described in any one of the items 10 to 18.

20. A polarizing plate comprising: a polarizer; and two protective films, wherein one of the two protective films is an antireflection film as described in any one of the items 10 to 18, and the other of the two protective films is an optical compensation film having an optical anisotropy.

21. An image display device comprising an antireflection film as described in any one of the items 10 to 18 or a polarizing plate as described in the item 19 or 20, disposed on an image screen of the image display device.

22. The image display device as described in the item 21, which is one of a transmission, reflection and semi-transmission liquid crystal displays in one mode of TN, STN, IPS, VA, OCB and ECB modes.

The invention can provide an antireflection film having a high antireflection property, and excellent in scratch resistance, a dust-proof property, and an antifouling property.

The invention can further provide a protective film for a polarizing plate, a polarizing plate, and an image display device having the above properties by using the antireflection film.

Figure 1:
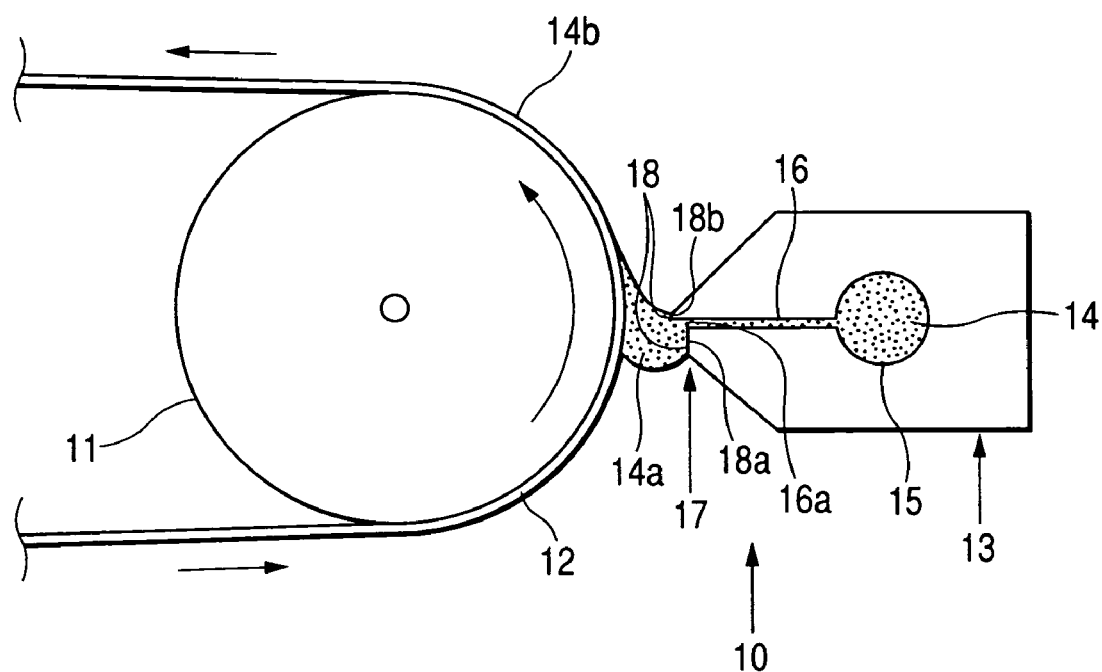
FIG. 1 is a typical cross-sectional view showing an example of a die coater preferably used in the manufacture of an antireflection film in the invention.

DETAILED DESCRIPTION OF THE INVENTION.

An exemplary embodiment of the invention will be described in further detail below.

In the specification of the invention, when numerical values represent physical values and characteristic values, the description "from (numerical value 1) to (numerical value 2)" means "(numerical value 1) or more and (numerical value 2) or less". Further, "(meth)acrylate" means "at least either acrylate or methacrylate", and this also applies to "(meth)acrylic acid".

(1) Curable Composition and Cured Film

A curable composition in the invention contains (A) at least either a hydrolyzed product of organosilane or a condensation reaction product of the hydrolyzed product having a mass average molecular weight (a weight average molecular weight) of from 500 to 10,000 in terms of ethylene glycol, (B) a fluorine-containing resin having a mass average molecular weight of 5,000 or more in terms of polystyrene, and a fluoroalkyl structure and a polysiloxane structure, and (C) a silane coupling agent represented by formula (1) or at least either a hydrolyzed product of the silane coupling agent or a condensation reaction product of the hydrolyzed product. These components (A) to (C) will be described below.

(A) Hydrolyzed Product of Organosilane and Condensation Reaction Product thereof:

The organosilane in component (A) is preferably a compound represented by the following formula (2). By containing a compound represented by formula (2) in a curable composition, an antireflection film excellent in resistance to sticking of fingerprints and wiping off of soiling can be obtained.

$(R^b)_m—Si(X^b)_{4-m}$         (2)

In formula (2), $R^b$ represents a substituted or unsubstituted alkyl group, or a substituted or unsubstituted aryl group. As the alkyl groups, a methyl group, an ethyl group, a propyl group, an isopropyl group, a hexyl group, a t-butyl group, a sec-butyl group, a decyl group, and a hexadecyl group are exemplified. The alkyl group is preferably an alkyl group having from 1 to 30 carbon atoms, more preferably from 1 to 16, and especially preferably from 1 to 6 carbon atoms. As the aryl groups, a phenyl group and a naphthyl group are exemplified, and preferably a phenyl group.

In formula (2), $X^b$ represents a hydroxyl group or a group capable of hydrolysis. As the group capable of hydrolysis, e.g., an alkoxyl group (preferably an alkoxyl group having from 1 to 5 carbon atoms, e.g., a methoxy group, all ethoxy group, etc.), a halogen atom (e.g., Cl, Br, I, etc.), and an $R^2COO$ group ($R^2$ preferably represents a hydrogen atom or an alkyl group having from 1 to 5 carbon atoms, e.g., a $CH_3COO$ group, a $C_2H_5COO$ group, etc.) are exemplified, preferably an alkoxyl group, and especially preferably a methoxy group or an ethoxy group.

m represents an integer of from 0 to 3. When a plurality of $R^b$ or $X^b$ are present, the plurality of $R^b$ or $X^b$ may be the same or different m preferably represents from 0 to 2.

It is preferred that at least any of hydrolysis and condensation reaction of organosilane is carried out in the presence of a catalyst. As the catalysts, inorganic acids, e.g., hydrochloric acid, sulfuric acid, nitric acid, etc.; organic acids, e.g., oxalic acid, acetic acid, formic acid, methanesulfonic acid, toluenesulfonic acid, etc.; inorganic bases, e.g., sodium hydroxide, potassium hydroxide, ammonia, etc.; organic bases, e.g., triethylamine, pyridine, etc.; and metal alkoxides, e.g., triisopropoxyaluminum, tetrabutoxy-zirconium, etc., are exemplified. In view of manufacturing stability of a sol solution containing a hydrolyzed product of organosilane or a condensation reaction product of the hydrolyzed product, and preservation stability of the sol solution, at least any of acid catalysts (inorganic acids and organic acids) and metal chelate compounds is used in the invention.

As inorganic acids, hydrochloric acid and sulfuric acid, and as organic acids, acids having an acid dissociation constant (a pKa value (at 25° C.)) in water of 4.5 or less are preferred. As organic acids, hydrochloric acid, sulfuric acid, and organic acids having an acid dissociation constant in water of 3.0 or less are more preferred, hydrochloric acid, sulfuric acid, and organic acids having an acid dissociation constant in water of 2.5 or less are furthermore preferred, organic acids having an acid dissociation constant in water of 2.5 or less are still more preferred, and methanesulfonic acid, oxalic acid, phthalic acid, and malonic acid are still further preferred, and oxalic acid is especially preferred.

The use amount of an acid catalyst is from 0.01 to 10 mol % based on the hydrolyzable group in a case where the acid catalyst is an inorganic acid, and preferably from 0.1 to 5 mol %. Although the optimal use amount of an acid catalyst differs according to the addition amount of water in a case where the acid catalyst is an organic acid, the amount is from 0.01 to 10 mol % based on the hydrolyzable group in a case where water is added, and preferably from 0.1 to 5 mol %. When water is not substantially added, the use amount is from 1 to 500 mol % based on the hydrolyzable group, preferably from 10 to 200 mol %, more preferably from 20 to 200 mol %, still more preferably from 50 to 150 mol %, and especially preferably from 50 to 120 mol %. The reaction is performed with stirring at 25 to 100° C., and it is preferred that the amount of acid catalyst is adjusted according to the reactivity of organosilane.

When a metal chelate compound is used for forming a hydrolyzed product of organosilane and in the condensation reaction, the metal chelate compound is preferably at least a metal chelate compound having a metal selected from Zr, Ti and Al as a central metal, and, as ligands, an alcohol represented by $R^3OH$ (where $R^3$ represents an alkyl group having from 1 to 10 carbon atoms) and a compound represented by $R^4COCH_2COR^5$ (where $R^4$ represents an alkyl group having from 1 to 10 carbon atoms, and $R^5$ represents an alkyl group having from 1 to 10 carbon atoms or an alkoxyl group having from 1 to 10 carbon atoms).

As the metal chelate compound, compounds having a metal selected from Zr, Ti and Al as a central metal can be preferably used. Two or more metal chelate compounds may be used in combination. The specific examples of the metal chelate compounds include zirconium chelate compounds, e.g., tri-n-butoxyethylacetoacetatezirconium, di-n-butoxy-bis-(ethylacetoacetate)zirconium, n-butoxytris(ethylacetoacetate)zirconium, tetrakis(n-propylacetoacetate)zirconium, tetrakis(acetylacetoacetate)zirconium, and tetrakis(ethyl-acetoacetate) zirconium; titanium chelate compounds, e.g., diisopropoxy-bis(ethylacetoacetate)titanium, diisopropoxy-bis(acetylacetate)titanium, and diisopropoxy-bis(acetyl-acetone)titanium; and aluminum chelate compounds, e.g., diisopropoxyethylacetoacetatealuminum, diisopropoxy-acetyl-acetonatoaluminum, isopropoxybis(ethylacetoacetate)aluminum, isopropoxybis(acetylacetonato)aluminum, tris(ethylaceto-acetate)aluminum, tris(acetylacetonato)aluminum, and monoacetylacetonato-bis(ethylacetoacetate)aluminum.

Of these metal chelate compounds, preferred compounds are tri-n-butoxyethylacetoacetatezirconium, diisopropoxy-bis(acetylacetonato)titanium, diisopropoxyethylaceto-acetatealuminum, and tris(ethylacetoacetate)aluminum. These metal chelate compounds can be used alone, or two or more compounds may be used as mixture. Partially hydrolyzed products of these metal chelate compounds can also be used.

Hydrolysis and condensation reaction of organosilane can be carried out in a solvent-free state or in a solvent. When a solvent is used, the concentration of a hydrolyzed product of organosilane and a partial condensation reaction product of the hydrolyzed product can be arbitrarily determined. For uniform mixture of components, it is preferred to use an organic solvent, e.g., alcohols, aromatic hydrocarbons, ethers, ketones and esters are preferably used. Solvents capable of dissolving organosilane and catalysts are preferably used. It is preferred in processing that an organic solvent is used as a coating solution or a part of a coating solution, and solvents that do not impair solubility or dispersibility when component (A) is mixed with other materials, e.g., fluorine-containing polymers, are preferred.

Of these solvents, as alcohols, e.g., monohydric alcohols and dihydric alcohols can be exemplified. As monohydric alcohols, saturated aliphatic alcohols having from 1 to 8 carbon atoms are preferred. As the specific examples of these alcohols, methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate are exemplified.

The specific examples of aromatic hydrocarbons include benzene, toluene and xylene, the specific examples of ethers include tetrahydrofuran and dioxane, the specific examples of ketones include acetone, methyl ethyl ketone, methyl isobutyl ketone, and diisobutyl ketone, and the specific examples of esters include ethyl acetate, propyl acetate, butyl acetate, and propylene carbonate. These organic solvents can be used alone, or two or more solvents can be used as mixture. The concentration of the solids content to the solvent in the reaction is not especially restricted, but generally in the range of from 1 to 90 mass % (weight %), and preferably in the range of from 20 to 70 mass %.

The hydrolysis and the condensation reaction are generally performed by adding from 0.3 to 2 mol, preferably from 0.5 to 1 mol, of water to 1 mol of the hydrolyzable group of the organosilane, and stirring at 25 to 100° C. in the presence or absence of the solvent. In a case where the hydrolyzable group is an alkoxyl group and the acid catalyst is an organic acid, the addition amount of water can be decreased because the carboxyl group and the sulfo group of the organic acid supply protons. The addition amount of water to 1 mol of the hydrolyzable group, e.g., an alkoxyl group, of organosilane is from 0 to 2 mol, preferably from 0 to 1.5 mol, more preferably from 0 to 1 mol, and especially preferably from 0 to 0.5 mol. When an alcohol is used as the solvent, it is also preferred not to substantially add water.

A hydrolyzed product of organosilane or a condensation reaction product thereof of component (A) may have a chain structure or a three dimensional network structure.

It is preferred for a hydrolyzed product of organosilane or a condensation reaction product thereof to have a mass average molecular weight of from 500 to 10,000 in terms of ethylene glycol. When the mass average molecular weight is in the above range, the Si component of component (A) localizes on the surface of a low refractive index layer, so that the scratch resistance and the antifouling property of the low refractive index layer can be sufficiently ensured. Further, the mass average molecular weight in the above range results in the advantages such that the coating property and the preservation stability of the curable composition can be maintained. The mass average molecular weight in terms of ethylene glycol of a hydrolyzed product of organosilane or a condensation reaction product thereof is more preferably from 800 to 9,000, am still more preferably from 1,000 to 8,000.

The mass average molecular weight is a molecular weight detected and analyzed with a GPC analyzer using columns of TSKgel GMHxL, TSKgel G4000HxL, and TSKgel G2000HxL (trade names, manufactured by TOSO CORPORATION), a solvent (DMF), and a differential refractometer, and expressed in terms of ethylene glycol.

(B) Fluorine-Containing Resin having Fluoroalkyl Structure and Polysiloxane Structure:

A fluorine-containing resin (B) can be obtained by at least any of the hydrolysis and the condensation reaction of either one of a compound represented by formula (1) and a compound represented by formula (2) with a compound having a fluoroalkyl structure (preferably a compound represented by the following formula (5)).

In formula (5), Rf represents a straight chain, branched or cyclic fluorine-containing alkyl group having from 1 to 20 carbon atoms, or a fluorine-containing aromatic group having from 6 to 14 carbon atoms. Rf preferably represents a straight chain, branched or cyclic fluoroalkyl group having from 3 to 10 carbon atoms, and more preferably a straight chain fluoroalkyl group having from 4 to 8 carbon atoms.

$L_1$ represents a divalent linking group having 10 or less carbon atoms, preferably represents an alkylene group having from 1 to 10 carbon atoms, and more preferably an alkylene group having from 1 to 5 carbon atoms. The alkylene group is a straight chain or branched, substituted or unsubstituted alkylene group that may have a linking group inside (e.g., ether, ester, amide). The alkylene group may have a substituent, and as preferred substituents in that case, a halogen atom, a hydroxyl group, a mercapto group, a carboxyl group, an epoxy group, an alkyl group, an aryl group, etc., are exemplified.

$X_1$ has the same meaning as $X^a$ in formula (1), and preferably represents a halogen atom, a hydroxyl group, or an unsubstituted alkoxyl group, more preferably a chlorine atom, a hydroxyl group, or an unsubstituted alkoxyl group having from 1 to 6 carbon atoms, still more preferably a hydroxyl group or an alkoxyl group having from 1 to 3 carbon atoms, and especially preferably a methoxy group.

Of the fluorine-containing silane coupling agents represented by formula (5), a fluorine-containing silane coupling agent represented by the following formula (6) is preferred:

In formula (6), n represents an integer of from 1 to 10, and m represents an integer of from 1 to 5. n is preferably from 4 to 10, and m is preferably from 1 to 3. $X_2$ represents a methoxy group, an ethoxy group, or a chlorine atom.

When a compound represented by formula (2) is used in the formation of a fluorine-containing resin, the compound represented by formula (2) is preferably tetramethoxysilane or tetraethoxysilane.

As solvents, catalysts and reaction conditions for use in the hydrolysis and condensation reaction for obtaining a fluorine-containing resin, the solvents, catalysts and reaction conditions described above in (A) a hydrolyzed product of organosilane or a condensation reaction product of the hydrolyzed product can be applied.

The reaction ratio of either formula (1) or formula (2)/formula (5) in a fluorine-containing resin is not especially restricted, but formula (1) and/or formula (2)/formula (5) is preferably from 1 to 10/1, and more preferably from 2 to 10/1.

It is preferred for a fluorine-containing resin (B) to have at least any group of a hydroxyl group and an epoxy group. At least either a hydroxyl group or an epoxy group in a fluorine-containing resin (B) can react with a hydrolyzed product of organosilane or a condensation reaction product of the hydrolyzed product (A), and with a polysiloxane structure in a fluorine-containing resin (B), by which the film strength of a low refractive index layer is heightened and the scratch resistance can be bettered. A hydroxyl group or an epoxy group may be introduced into a fluoroalkyl structure, or into a polysiloxane structure. A hydroxyl group or an epoxy group can be introduced by the copolymerization of compounds having these functional groups.

A fluorine-containing resin (B) may have a chain structure or a three dimensional network structure. The mass average molecular weight in terms of polystyrene of a fluorine-containing resin (B) is preferably 5,000 or more, more preferably from 5,000 to 100,000, and still more preferably from 5,000 to 50,000. When the mass average molecular weight is 5,000 or more, the scratch resistance of a low refractive index layer can be sufficiently ensured. On the other hand, when the mass average molecular weight is 100,000 or less, the coating property and the preservation stability of the curable composition can be maintained.

The mass average molecular weight is a molecular weight detected and analyzed with a GPC analyzer using columns of TSKgel GMHxL, TSKgel G4000HxL, and TSKgel G2000HxL (trade names, manufactured by TOSO CORPORATION), a solvent (THF), and a differential refractometer, and expressed in terms of polystyrene.

(C) Silane Coupling Agent Represented by Formula (1) or Hydrolyzed Product, Condensation Reaction Product thereof:

A curable composition in the invention contains (C) a silane coupling agent represented by the following formula (1) or at least either a hydrolyzed product of the silane coupling agent or a condensation reaction product of the hydrolyzed product. By using a compound represented by formula (1) as the silane coupling agent, an antireflection film that is excellent in adhesion properties, in particular interfacial adhesion properties, can be obtained.

In formula (1), the substituent represented by $R^a$ is not especially restricted, and a halogen atom (e.g., a fluorine atom, a chlorine atom, a bromine atom, etc.), a hydroxyl group, a mercapto group, a carboxyl group, an epoxy group, an alkyl group (e.g., a methyl group, an ethyl group, an i-propyl group, a propyl group, a t-butyl group, etc.), an aryl group (e.g., a phenyl group, a naphthyl group, etc.), an aromatic heterocyclic group (e.g., a furyl group, a pyrazolyl group, a pyridyl group, etc.), an alkoxyl group (e.g., a methoxy group, an ethoxy group, an i-propoxy group, a hexyloxy group, etc.), an aryloxy group (e.g., a phenoxy group, etc.), an alkylthio group (e.g., a methylthio group, an ethylthio group, etc.), an arylthio group (e.g., a phenylthio group, etc.), an alkenyl group (e.g., a vinyl group, a 1-propenyl group, etc.), an acyloxy group (e.g., an acetoxy group, an acryloyloxy group, a methacryloyloxy group, etc.), an alkoxycarbonyl group (e.g., a methoxycarbonyl group, an ethoxycarbonyl group, etc.), an aryloxycarbonyl group (e.g., a phenoxycarbonyl group, etc.), a carbamoyl group (e.g., a carbamoyl group, an N-methyl-carbamoyl group, an N,N-dimethylcarbamoyl group, an N-methyl-N-octylcarbamoyl group, etc.), and an acylamino group (e.g., an acetylamino group, a benzoylamino group, an acrylamino group, a methacrylamino group, etc.) are exemplified, and these substituents may further be substituted. Incidentally, in the specification of the invention, even if those that substitute a hydrogen atom are single atoms, they are dealt with as substituents for convenience.

$R^a$ preferably represents a substituent having any one group of a hydroxyl group, a mercapto group, a carboxyl group, an epoxy group, an aryl group, an alkoxyl group, an aryloxy group, an alkenyl group, an acyloxy group, an alkoxycarbonyl group, an aryloxycarbonyl group, a carbamoyl group, and an acylamino group, more preferably represents a substituent having any one group of an epoxy group, an acyloxy group, and an acylamino group, and especially preferably an acryloyloxy group.

In formula (1), when a plurality of $R^a$'s are present, it is preferred that at least one $R^a$ is a substituted alkyl group or a substituted aryl group, and it is particularly preferred that the substituted alkyl group or the substituted aryl group further has a vinyl polymerizable group. In this case, a compound represented by formula (1) can be represented as a silane coupling agent having a vinyl polymerizable substituent represented by the following formula (4).

In formula (1), $X^a$ represents a hydroxyl group or a group capable of hydrolysis. As the group capable of hydrolysis, e.g., an alkoxyl group (preferably an alkoxyl group having from 1 to 5 carbon atoms, e.g., a methoxy group, an ethoxy group, etc.), a halogen atom (e.g., Cl, Br, I, etc.), and an $R^2COO$ group ($R^2$ preferably represents a hydrogen atom or an alkyl group having from 1 to 5 carbon atoms, e.g., a $CH_3COO$ group, a $C_2H_5COO$ group, etc.) are exemplified, preferably an alkoxyl group, and especially preferably a methoxy group or an ethoxy group.

m is an integer represented by $1 \leq m \leq 3$. When a plurality of $R^a$ or $X^a$ are present, the plurality of $R^a$ or $X^a$ may be the same or different. m preferably represents from 0 to 2.

A silane coupling agent represented by formula (1) is preferably a compound represented by the following formula (4). By the use of a compound represented by formula (4) as a silane coupling agent, an antireflection film that is further excellent in interfacial adhesion can be obtained.

Formula (4):

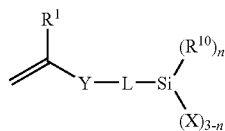

In formula (4), $R^1$ represents a hydrogen atom, a methyl group, a methoxy group, an alkoxycarbonyl group, a cyano group, a fluorine atom or a chlorine atom. As the alkoxycarbonyl group, a methoxycarbonyl group, an ethoxycarbonyl group, etc., are exemplified. $R^1$ preferably represents a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, and especially preferably a hydrogen atom or a methyl group.

Y represents a single bond, an ester group, an amido group, an ether group, or a urea group, preferably a single bond, an ester group or an amido group, more preferably a single bond or an ester group, and especially preferably an ester group.

In formula (4), L represents a divalent linking group, and specifically a substituted or unsubstituted alkylene group, a substituted or unsubstituted arylene group, a substituted or unsubstituted alkylene group having a linking group inside (e.g., an ether group, an ester group, an amide group), and a substituted or unsubstituted arylene group having a linking group inside are exemplified. Of these groups, a substituted or unsubstituted alkylene group having from 2 to 10 carbon atoms, a substituted or unsubstituted arylene group having from 6 to 20 carbon atoms, and an alkylene group having a linking group inside and from 3 to 10 carbon atoms are preferred, an unsubstituted alkylene group, an unsubstituted arylene group, and an alkylene group having an ether linking group or an ester linking group inside are more preferred, and an unsubstituted alkylene group, and an alkylene group having an ether linking group or an ester linking group inside are especially preferred. As the substituents, a halogen atom, a hydroxyl group, a mercapto group, a carboxyl group, an epoxy group, an alkyl group, an aryl group, etc., are exemplified, and these substituents may further be substituted.

In formula (4), n represents 0 or 1. When a plurality of X's are present, tie plurality of X's may be the same or different. n is preferably 0.

$R^{10}$ has the same meaning as $R^b$ in formula (2), and preferably represents a substituted or unsubstituted alkyl group or an unsubstituted aryl group, and more preferably represents an unsubstituted alkyl group or an unsubstituted aryl group.

As the solvents, catalysts and reaction conditions for use in the hydrolysis and condensation reaction for obtaining a hydrolyzed product of a silane coupling agent and a condensation reaction product of the hydrolyzed product, the solvents, catalysts and reaction conditions described above in (A) a hydrolyzed product of organosilane and a condensation reaction product of the hydrolyzed product can be applied.

A silane coupling agent represented by formula (1) or a hydrolyzed product of the silane coupling agent and a condensation reaction product of the hydrolyzed product(C) may have a chain structure or a three dimensional network structure. The mass average molecular weight of the component (C) in terms of polystyrene is preferably from 500 to 10,000, more preferably from 800 to 9,000, and especially preferably from 1,000 to 8,000. When the mass average molecular weight is in the above range, the scratch resistance of a low refractive index layer can be sufficiently ensured.

The mass average molecular weight is a molecular weight detected and analyzed with a GPC analyzer using columns of TSKgel GMHxL, TSKgel G4000HxL, and TSKgel G2000HxL (trade names, manufactured by TOSO CORPORATION), a solvent (THF), and a differential refractometer, and expressed in terms of polystyrene.

(D) Inorganic Fine Particles:

A curable composition in the invention can contain inorganic fine particles.

The average particle size of the inorganic fine particles is preferably from 5 to 100 nm, more preferably from 10 to 90 nm, and still more preferably from 15 to 85 nm. It is preferred for the inorganic fine particles to be contained in a curable composition in proportion of from 5 to 80 mass % based on the solids content in the curable composition, more preferably from 10 to 70 mass %, and still more preferably from 15 to 65 mass %. When the content of the inorganic fine particles is not lower than the greatest lower bound, scratch resistance can be effectively improved, and when the content is not greater than the least upper bound, a low refractive index layer is not accompanied by nonconformities such as the occurrence of slight unevenness on the surface, or deteriorations of external appearance such as deep blacks and integrated reflectance, so that the content of the inorganic fine particles is preferably in the above range.

It is preferred that the inorganic fine particles contained in a curable composition have a low refractive index. As such inorganic fine particles, fine particles of magnesium fluoride and silica can be exemplified. It is especially preferred to use silica fine particles in the light of the refractive index, dispersion stability, and economical viewpoints. The silica fine particles may be crystallizable or amorphous, or may be monodispersed particles, or may be agglomerated particles so long as they satisfy the prescribed particle size. The configuration of the particles is most preferably spherical, but amorphous particles can be used with no problem. Incidentally, the average particle size of inorganic fine particles is measured with a coal tar counter.

To lessen an increase in refractive index of a cured film formed with a curable composition, it is preferred to use silica fine particles having holes at least inside or on the surfaces as the inorganic fine particles. It is especially preferred to use hollow silica fine particles (hereinafter sometimes referred to as hollow particles). The refractive index of the hollow particles is preferably from 1.17 to 1.40, more preferably from 1.17 to 1.35, and especially preferably from 1.17 to 1.30. The refractive index here means a refractive index of a particle as a whole, and does not mean the refractive index of only the silica component of the shell constituting the hollow particle. The refractive index of the hollow particles is preferably 1.17 or more in view of the strength of the particles and the scratch resistance of a low refractive index layer containing the hollow particles.

The refractive index of hollow particles can be measured with an Abbe's refractometer (manufactured by ATAGO CO., LTD.), and this is a value at 25° C. to D-line.

The average diameter of a hole present at least in the inside or on the surface of a fine particle is preferably from 0.01 to 90 run, more preferably from 4 to 90 nm, and still more preferably from 4 to 80 nm. The average diameter of a hole is preferably in the above range in view of the refractive index and strength of the inorganic fine particles.

When the average diameter of a hole is 0.01 nm or more, the effect of lowering the refractive index is great. While when the average diameter of a hole is 90 run or less, the strength of the particles can be maintained and excellent scratch resistance can be retained.

The inorganic fine particles may be subjected to physical surface treatment such as plasma discharge treatment and corona discharge treatment and chemical surface treatment with a surfactant and a coupling agent for the purpose of dispersion stability of the inorganic fine particles in a dispersion or in a coating solution, or for increasing the affinity and integrity with the binder components.

Crosslinkable Compound:

A crosslinkable compound can be blended with a curable composition. As the crosslinkable compounds, e.g., melamine resins, glycols, acrylic resins, azides, and isocyanates are exemplified. Of these compounds, from the point of the preservation stability of a curable composition, melamine resins such as methylolated melamine, alkoxymethylated melamine, and derivatives of these melamine resins are preferred. The proportion of the crosslinkable compound is preferably 70 mass parts or less per 100 mass parts of a fluorine-containing resin (B), more preferably 30 mass parts or less, and still more preferably from 5 to 30 mass parts.

Acid Generator:

An acid generator can be blended with a curable composition. As the acid generators, those that can be uniformly dissolved in the curable composition, do not decompose the curable composition, and do not lower the film transparency of a cured film are preferred. As the acid generators, organic acids, e.g., p-toluenesulfonic acid and benzoic acid, and photo-acid generators, e.g., triazine compounds, are exemplified. The proportion of the acid generators is preferably 10 mass parts or less per 100 mass parts of the fluorine compound (component (B)), more preferably 5 mass parts or less, and still more preferably from 0.1 to 5 mass parts.

The acid generator is preferably a salt comprising an acid and an organic base. As the acid, organic acids such as sulfonic acid, phosphonic acid and carboxylic acid, and inorganic acids such as sulfuric acid and phosphoric acid are exemplified. More preferably an organic acid from the point of the compatibility with the polymer, more preferably sulfonic acid and phosphonic acid, and most preferably sulfonic acid. As preferred sulfonic acids, p-toluenesulfonic acid (PTS), benzenesulfonic acid (BS), p-dodecylbenzenesulfonic acid (DBS), p-chlorobenzenesulfonic acid (CBS), 1,4-naphthalene-disulfonic acid (NDS), methanesulfonic acid (MsOH), and nonafluorobutane-1-sulfonic acid (NFBS) are exemplified, and any of these sulfonic acids can be preferably used.

Acid generators greatly vary according to the basicity and boiling points of the organic base to be combined with acids. Acid generators preferably used in the invention are described below from each viewpoint.

The lower the basicity of the organic base, the higher is the efficiency of acid generation at the time of heating and preferred from the viewpoint of curing activity, but if the basicity is too low, preservation stability is insufficient. Accordingly, it is preferred to use organic base having appropriate basicity. Describing the index of basicity by using the pKa of conjugate acid, pKa of the organic base for use in the invention is preferably from 5.0 to 10.5, more preferably from 6.0 to 10.0, and still more preferably from 6.5 to 10.0. The values of pKa of organic bases in aqueous solutions are described in *Kapaku Binran, Kiso-Hen (Chemical Handbook, Elementary Course)*, $5^{th}$ Edition (revised version), Vol. 2, pp. II-334 to 340, compiled by Nippon Kagaku-kai, published by Maruzen Co (2004), and an organic base having an appropriate pKa can be selected from among them. Compounds presumed to have an appropriate pKa from the structure can also be preferably used, even if they are not described in the literature. The compounds having an appropriate pKa described in the literature are shown in Table below, but the compounds that can be preferably used in the invention are not restricted to these compounds.

TABLE

|      |                              | pKa  |
|------|------------------------------|------|
| b-1  | N,N-Dimethylaniline          | 5.1  |
| b-2  | Benzimidazole                | 5.5  |
| b-3  | Pyridine                     | 5.7  |
| b-4  | 3-Methylpyridine             | 5.8  |
| b-5  | 2,9-Dimethyl-1,10-phenanthroline | 5.9 |
| b-6  | 4,7-Dimethyl-1,10-phenanthroline | 5.9 |
| b-7  | 2-Methylpyridine             | 6.1  |
| b-8  | 4-Methylpyridine             | 6.1  |
| b-9  | 3-(N,N-Dimethylamino)pyridine | 6.5 |
| b-10 | 2,6-Dimethylpyridine         | 7.0  |
| b-11 | Imidazole                    | 7.0  |
| b-12 | 2-Methylimidazole            | 7.6  |
| b-13 | N-Ethylmorpholine            | 7.7  |
| b-14 | N-Methylmorpholine           | 7.8  |
| b-15 | bis(2-Methoxyethyl)amine     | 8.9  |
| b-16 | 2,2'-Iminodiethanol          | 9.1  |
| b-17 | N,N'-Dimethyl-2-aminoethanol | 9.5  |
| b-18 | Trimethylamine               | 9.9  |
| b-19 | Triethylamine                | 10.7 |

The lower the boiling point of the organic base, the higher is the efficiency of acid generation at the time of heating and preferred from the viewpoint of curing activity. Accordingly, it is preferred to use organic bases having an appropriate boiling point. The boiling point of a base is preferably 120° C. or less, more preferably 80° C. or less, and still more preferably 70° C. or less.

As the organic bases preferably used in the invention, the following compounds are exemplified, but the invention is not limited thereto. Those in parentheses are boiling points.

b-3: pyridine (115° C.), b-14: 4-methylmorpholine (115° C.), b-20: diallylmethylamine (111° C.), b-19: triethylamine (88.8° C.), b-21: t-butylmethylamine (67 to 69° C.), b-22: dimethylisopropylamine (66° C.), b-23: diethylmethylamine (63 to 65° C.), b-24: dimethylethylamine (36 to 38° C.), b-18: trimethylamine (3 to 5° C.).

The boiling point of the organic bases in the invention is preferably from 35 to 85° C. The boiling point higher than this range causes the deterioration of scratch resistance, and the temperature lower than 35° C. is accompanied by the instability of the coating solution. The boiling point of the organic bases in the invention is more preferably 80° C. or less, and most preferably from 55 to 75° C.

When used as acid catalysts, a salt comprising the acid and the organic base may be used in an isolated form, or by mixing the acid and the organic base to form a salt in a solution and the solution may be used. The acids and the organic bases may be respectively used alone, or a plurality of kinds may be used as mixture. When the acid and the organic base are used as mixture, it is preferred to mix them so that the equivalent ratio of the acid and the organic base is 1/0.95 to 1.5, more preferably from 1/0.95 to 1.3, and still more preferably 1/1.0 to 1.1.

Solvent:

As the solvents for use in the preparation of a curable composition, solvents capable of dissolving each component without being accompanied by separation can be used with no restriction. For example, ketones, e.g., methyl ethyl ketone, methyl isobutyl ketone, cyclohexanone, etc., and esters, e.g., ethyl acetate, butyl acetate, etc., are exemplified. Further, for the purpose of the improvement of coating properties and stability of a solution, bad solvents such as alcohols can be used in the range of not precipitating each component.

The concentration of the solution of a curable composition is not particularly restricted if it does not impair the solution stability. When a curable composition is used for forming an antireflection layer, it is necessary to form the thickness of a thin layer accurately, so that the concentration is generally from 0.1 to 20 mass %, and preferably from 0.5 to 10 mass %, in view of handling property.

For raising the preservation stability of a curable composition, it is preferred to add a solvent represented by formula (7): $R^4COCH_2COR^5$ to a curable composition. In formula (7), $R^4$ and $R^5$ have the same meaning as $R^4$ and $R^5$ constituting the metal chelate compounds as described above.

A solvent represented by formula (7) is at least either a β-diketone compound or a β-keto ester compound, which functions as a stability improver of a curable composition. That is, it is thought that by coordinating with the metal atom of the above-described metal chelate compound (at least any compound of zirconium, titanium and aluminum compounds), a solvent represented by formula (7) inhibits the function of acceleration of condensation reaction of the components represented by formulae (3) and (5) by the metal chelate compound to thereby stabilize the preservation stability of the composition to be obtained.

The specific examples of β-diketone compounds and β-keto ester compounds represented by formula (7) include acetylacetone, methyl acetoacetate, ethyl acetoacetate, n-propyl acetoacetate, i-propyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonanedione, 5-methylhexanedione, etc. Of these compounds, ethyl acetoacetate and acetylacetone are preferred, and acetylacetone is especially preferred. These β-diketone compounds and β-keto ester compounds can be used alone, or two or more compounds can be used as mixture.

In the invention, β-diketone compounds and β-keto ester compounds represented by formula (7) are used preferably in an amount of 2 mols or more in total of both per mol of the metal chelate compound, and more preferably from 3 to 20 mols. When the amount is too little, the preservation stability of a composition obtained is inferior, and so not preferred.

Addition Amount of Each Component:

In a curable composition of the invention, the mixing ratio of (A) a hydrolyzed product of organosilane or a condensation reaction product of the hydrolyzed product and (B) a fluorine-containing resin is arbitrarily adjusted according to the use purpose of a cured film obtained from the curable composition. When the ratio of (A) a hydrolyzed product of organosilane or a condensation reaction product increases, the ratio of (B) a fluorine-containing resin decreases, as a result the refractive index of a cured film rises or an antifouling property is liable to lower. On the other hand, when the ratio of (A) a hydrolyzed product of organosilane or a condensation reaction product decreases, the film strength of a low refractive index layer weakens, so that the scratch resistance tends to lower. From these points of view, when a cured film is used as a low refractive index layer, the ratio of (A) a hydrolyzed product of organosilane and a condensation reaction product of the hydrolyzed product in the curable composition is generally preferably from 5 to 90 mass % in solids content to the total of (A) a hydrolyzed product of organosilane and a condensation reaction product and (B) a fluorine-containing resin, and more preferably from 30 to 75 mass %.

In a curable composition of the invention, the proportion of (C) a silane coupling agent or a hydrolyzed product of the silane coupling agent or a condensation reaction product is preferably from 3 to 80 mass % of the sum total of the component (A) and the component (B), more preferably from 5 to 70 mass %, and especially preferably from 8 to 60 mass %.

Fluorine Atom Content:

The content of fluorine atoms in a curable composition is preferably 5 mass % or more, more preferably from 5 to 60 mass %, still more preferably from 5 to 40 mass %, further still more preferably from 7 to 38 mass %, and especially preferably from 10 to 30 mass %. When the content of fluorine atoms is less than 5 mass %, an antifouling property of a low refractive index layer lowers, while when the content exceeds 60 mass %, scratch resistance decreases and not preferred.

In the invention, the content of fluorine atoms in a curable composition is a value determined by 600 MHz NMR (model AVANCE600, manufactured by Bruker) (an acetone-d6 solution with $CF_3$-Ph as an internal standard substance was determined by $^{19}$F-NMR).

Forming Method of Cured Film:

As the curing means of a curable composition, it is preferred to use at least any means of heat and ionizing radiation. The temperature of heat curing is preferably from 60 to 150° C., more preferably from 80 to 140° C., and especially preferably from 100 to 140° C. When the heating temperature is in the above range, a base is difficult to be deformed.

The curing time is preferably from 0.5 to 120 minutes, more preferably from 1 to 60 minutes, and especially preferably from 2 to 30 minutes. When the curing time is in the above range, the productivity is not impaired.

In a curing means with ionizing radiation, it is preferred that irradiation with ionizing radiation is carried out in an atmosphere of oxygen concentration of 3 vol % or less, more preferably 1 vol % or less, and still more preferably 0.1 vol % or less. The reduction of oxygen concentration to more than a necessary amount necessitates the use of a great amount of inert gas, which is not preferred in view of manufacturing costs. As a means of reducing oxygen concentration, it is preferred to replace the atmosphere (nitrogen concentration: about 79 vol %, oxygen concentration: about 21 vol %) with other gas, especially preferably to replace with nitrogen (nitrogen purge).

When a curing means by ionizing radiation is used, it is particularly preferred to perform curing upon irradiation with ionizing radiation in the atmosphere of oxygen concentration of 3 vol % or less for 0.2 seconds or more. The time of irradiation is preferably from 0.2 to 60 seconds from the beginning of irradiation, and more preferably from 0.3 to 10 seconds. The irradiation time of less than 0.2 seconds cannot complete curing reaction, so that there are cases where sufficient curing cannot be done.

(2) Antireflection Film

An antireflection film in the invention comprises a transparent support having provided thereon a hard coat layer directly or via other layer, and all antireflection layer on the hard coat layer by stacking.

Each layer constituting an antireflection film is described below.

Antireflection Layer (Low Refractive Index Layer):

An antireflection layer (a low refractive index layer) is formed from a cured film comprising a curable composition described in the above item 1.

The refractive index of a low refractive index layer is preferably from 1.20 to 1.46, more preferably from 1.25 to 1.40, and especially preferably from 1.25 to 1.38.

The thickness of a low refractive index layer is preferably from 50 to 200 nm, and more preferably from 70 to 120 nm. The haze of a low refractive index layer is preferably 3% or less, more preferably 2% or less, and most preferably 1% or less. The specific strength of a low refractive index layer is preferably H or higher by a pencil hardness test with a load of 500 g, more preferably 2H or higher, and most preferably 3H or higher.

Further, for the purpose of improving the antifouling property of an antireflection film, the contact angle of the surface to water is preferably 90° or more, more preferably 95° or more, and especially preferably 100° or more.

Hard Coat Layer:

A hard coat layer is formed from a curable composition including: a resin composition capable of curing upon at least one of heating and ionizing radiation; and a curable composition containing a silane coupling agent represented by formula (1) or at least either a hydrolyzed product of the silane coupling agent or a condensation reaction product of the hydrolyzed product.

Resin Composition:

As the resin compositions capable of curing with at least any means of heat and ionizing radiation, resin compositions comprising ionizing radiation-curable polyfunctional monomers and polyfunctional oligomers are exemplified.

As the functional groups of the ionizing radiation-curable polyfunctional monomers and polyfunctional oligomers, photo-, electron beam- and radiation-polymerizable functional groups are preferred, and photo-polymerizable functional groups are especially preferred. As the photo-polymerizable functional groups, unsaturated polymerizable functional groups such as a (meth)acryloyl group, a vinyl group, a styryl group, an allyl group, etc., are exemplified, and a (meth)acryloyl group is preferred of all.

As the examples of photo-polymerizable polyfunctional monomers having a photo-polymerizable functional group, esters of polyhydric alcohol and (meth)acrylic acid [e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerytlritol penta(meth)acrylate, dipentaerytlritol hexa(meth)acrylate, pentaerythritol hexa(meth)acrylate, 1,2,3-cyclohexane tetra(meth)acrylate, polyurethane polyacrylate, and polyester polyacrylate], ethylene oxide modified products and caprolactone modified products of the above esters, vinylbenzene and derivatives thereof (e.g., 1,4-divinyl-benzene, 4-vinylbenzoic acid-2-acryloylethyl ester, and 1,4-divinylcyclohexanone), vinyl sulfone (e.g., divinyl sulfone), acrylamide (e.g., methylenebisacrylamide), and methacrylamide are specifically exemplified. Two or more of these monomers may be used in combination.

Photo-ppolymerizable polyfunctional monomers are preferably polymerized with a photo-polymerization initiator and a photosensitizer, and a photo-polymerization reaction is preferably carried out by irradiation with ultraviolet rays after coating and drying.

At least either an oligomer or a polymer having a mass average molecular weight of 500 or more may be added to a hard coat layer for giving resistance to brittleness. As the oligomers and polymers, (meth)acrylate-based, cellulose-based and styrene-based polymers, urethane acrylate and polyester acrylate are exemplified. Polyglycidyl (meth)-acrylate and polyallyl (meth)acrylate having a functional group at the side chains are preferably exemplified.

The content of at least either an oligomer or a polymer in a hard coat layer is preferably from 5 to 80 mass % to the total mass of the hard coat layer, more preferably from 25 to 70 mass %, and especially preferably from 35 to 65 mass %.

Leveling Agent:

It is preferred to use various leveling agents in a hard coat layer for the purpose of preventing unevenness. As the leveling agents, acrylic leveling agents, vinyl leveling agents, fluorine leveling agents, and silicone leveling agents are exemplified. Fluorine leveling agents and silicone leveling agents are preferably used.

As the leveling agents, oligomers and polymers are preferred to low molecular weight compounds. Fluorine leveling agents and silicone leveling agents are described later.

When a leveling agent is added to a hard coat layer, the leveling agent rapidly localizes on the surface of the coated film and is present as it is on the surface after drying of the hard coat layer, so that the surface energy of the hard coat layer lowers due to the leveling agent.

Accordingly, it is preferred that the surface energy of the hard coat layer is low from the viewpoint of the prevention of the unevenness of the hard coat layer.

The surface tension of the coating solution of a hard coat layer is preferably in the range of from 15 to 40 [mN/m]. When the surface tension is in this range, unevenness in drying can be prevented and preferred, more preferably from 18 to 36 [mN/m], and especially preferably from 20 to 33 [mN/m]. With this range of the surface tension, it is not necessary to lower the least upper bound of coating rate and preferred.

The surface energy of a hard coat layer ($\gamma s^v$: unit, mJ/m$^2$) is, with referring to D. K. Owens, *J. Appl. Polym. Sci.*, 13, 1741 (1969), a value in terms of energy of surface tension of an antiglare hard coat layer (mN/m unit is expressed in terms of mJ/m$^2$) defined by the value $\gamma s^v$ ($=\gamma s^d+\gamma s^h$) expressed by the sum of $\gamma s^d$ and $\gamma s^h$ found by the following simultaneous equations (1) and (2) from the contact angles $\theta_{H2O}$ and $\theta_{CH2I2}$ of pure water H$_2$O and methylene iodide CH$_2$I$_2$, respectively found experimentally on an antiglare hard coat layer. Before measuring a sample, it is necessary to subject the sample to humidity conditioning at prescribed conditions of the temperature and humidity for certain hour or more. It is preferred that the temperature in humidity conditioning is from 20 to 27° C., the humidity is from 50 to 65% RH, and the hour is 2 hours or more.

$$1+\cos\theta_{H2O}=2(\gamma s^d)^{1/2}((\gamma_{H2O}{}^d)^{1/2}/\gamma_{H2O}{}^v)+2(\gamma s^h)^{1/2}((\gamma_{H2O}{}^h)^{1/2}/\gamma_{H2O}{}^v) \quad (1)$$

$$1+\cos\theta_{CH2I2}=2(\gamma s^d)^{1/2}((\gamma_{CH2I2}{}^d)^{1/2}/\gamma_{CH2I2}{}^v)+2(\gamma s^h)^{1/2}((\gamma_{CH2I2}{}^h)^{1/2}/\gamma_{CH2I2}{}^v) \quad (2)$$

wherein $\gamma_{H2O}{}^d=21.8°$, $\gamma_{H2O}{}^h=51.0°$, $\gamma_{H2O}{}^v=72.8°$, $\gamma_{CH2I2}{}^d=49.5°$, $\gamma_{CH2I2}{}^h=1.3°$, $\gamma_{CH2I2}{}^v=50.8°$.

The surface energy of a hard coat layer is in a range of preferably 45 mJ/m$^2$ or less, more preferably from 20 to 45 mJ/m$^2$, and most preferably from 25 to 40 mJ/m$^2$.

By bringing the surface energy of a hard coat layer to 45 mJ/m$^2$ or less, an effect that coating unevenness of the hard coat layer is difficult to occur can be obtained.

However, since an upper layer, e.g., a low refractive index layer, is further coated on a hard coat layer, it is preferred for a leveling agent to be eluted to the upper layer, and the surface energy of the hard coat layer after the hard coat layer is immersed by the solvent of the coating solution of the upper layer of the hard coat layer is preferably rather high, the surface energy is preferably from 35 to 70 mJ/m$^2$.

As the preferred examples of silicone compounds, compounds containing a plurality of dimethylsilyloxy units as repeating units having substituents at the terminals and/or the side chains are exemplified. In the chains of the compounds containing dimethylsilyloxy units as repeating units, structural units other than the dimethylsilyloxy units may be contained. The substituents may be the same or different, and it is preferred to have a plurality of substituents. As the preferred examples of the substituents, groups containing a polyether group, an alkyl group, an aryl group, an aryloxy group, an acryloyl group, a methacryloyl group, a vinyl group, a cinnamoyl group, an epoxy group, an oxetanyl group, a hydroxyl group, a fluoroalkyl group, a polyoxyalkylene group, a carboxyl group, and an amino group are exemplified. The molecular weight of silicone compounds is not especially restricted, but is preferably 100,000 or less, more preferably 50,000 or less, especially preferably from 1,000 to 30,000, and most preferably from 1,000 to 20,000. The silicon atom content in the silicone compounds is not particularly restricted, but the content is preferably 18.0 mass % or more, especially preferably from 25.0 to 37.8 mass %, and most preferably from 30.0 to 37.0 mass %. As the preferred examples of the silicone compounds, X-22-174DX, X-22-2426, X-22-164B, X-22-164C, X-22-170DX, X-22-176D, X-22-1821 (trade names, manufactured by Shin-Etsu Chemical Co., Ltd.), FM-0725, FM-7725, FM-4421, FM-5521, FM-6621, FM-1121 (manufactured by Chisso Corporation), DMS-U22, RMS-033, RMS-083, UMS-182, DMS-H21, DMS-H31, HMS-301, FMS121, FMS123, FMS131, FMS141, FMS221 (trade names, manufactured by Gelest), SH200, DCIPA, SH28PA, ST80PA, ST86PA, ST97PA, SH550, SH710, L7604, FZ-2105, FZ2123, FZ2162, FZ-2191, FZ2203, FZ-2207, FZ-3704, FZ-3736, FZ-3501, FZ-3789 (trade names, manufactured by Toray Dow Corning), and TSF400, TSF401, TSF410, TSF433, TSF4450, TSF4460 (trade names, manufactured by GE Toshiba Silicone Co., Ltd.) are exemplified, but the invention is not limited thereto.

As the fluorine compounds, compounds having a fluoroalkyl group are preferred. The fluoroalkyl group preferably has from 1 to 20 carbon atoms, more preferably from 1 to 10, which may be a straight chain (e.g., —CF$_2$CF$_3$, —CH$_2$(CF$_2$)$_4$H, —CH$_2$(CF$_2$)$_8$CF$_3$, —CH$_2$CH$_2$(CF$_2$)$_4$H, etc.), may be a branched structure (e.g., CH(CF$_3$)$_2$, CH$_2$CF(CF$_3$)$_2$, CH(CH$_3$)CF$_2$CF$_3$, CH(CH$_3$)(CF$_2$)$_5$CF$_2$H, etc.), may be an alicyclic structure (preferably a 5- or 6-membered ring, e.g., a perfluorocyclohexyl group, a perfluorocyclopentyl group, or an alkyl group substituted with these groups), or may have an ether bond (e.g., CH$_2$OCH$_2$CF$_2$CF$_3$, CH$_2$CH$_2$OCH$_2$C$_4$F$_8$H, CH$_2$CH$_2$OCH$_2$CH$_2$C$_8$F$_{17}$, CH$_2$CH$_2$OCF$_2$CF$_2$OCF$_2$CF$_2$H, etc.). A plurality of the fluoroalkyl groups may be contained in the same molecule.

It is preferred for the fluorine compounds to have substituents that contribute to the binding formation or compatibility with a low refractive index layer. The substituents may be the same or different, and it is preferred to have a plurality of substituents. The examples of preferred substituents include an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group. The fluorine compounds may be polymers or oligomers with a compound not containing a fluorine atom, and the molecular weight is not especially restricted. The fluorine atom content in the fluorine compounds is not particularly restricted, but the content is preferably 20 mass % or more, especially preferably from 30 to 70 mass %, and most preferably from 40 to 70 mass %. As the preferred examples of the fluorine compounds, R-2020, M-2020, R-3833, M-3833 (trade names, manufactured by Daikin Industries Ltd.), and Megafac F-171, F-172D, F-179A, F-470, F-475, R-08, Defensa MCF-300 (trade names, manufactured by Dainippon Ink and Chemicals Inc.) are exemplified, but the invention is not limited thereto.

When these leveling agents are added, the addition amount is preferably from 0.01 to 20 mass % of the entire solids content of the hard coat layer, more preferably from 0.05 to 10 mass %, and especially preferably from 0.1 to 5 mass %.

Fluoro-Aliphatic Group-Containing Monomer Represented by Formula (3):

It is preferred for a curable composition for forming a hard coat layer to contain a fluoro-aliphatic group-containing monomer represented by formula (3).

In formula (3), $R^0$ represents a hydrogen atom, a halogen atom, or a methyl group, and more preferably a hydrogen atom or a methyl group. L represents a divalent linking group, and preferably a divalent linking group containing an oxygen atom, a sulfur atom, and a nitrogen atom. n represents an integer of from 1 to 18, more preferably from 4 to 12, and especially preferably from 6 to 8.

The above monomers may form copolymers with other kinds of copolymerizable monomers. As such other kinds of copolymerizable monomers, the monomers described in *Polymer Handbook*, $2^{nd}$ Ed., pp. 1 to 483, J. Brandrup, Wiley Interscience (1975) can be used.

As such monomers, for example, compounds having one addition polymerizable unsaturated bond selected from acrylic acid, methacrylic acid, acrylates, methacrylates, acrylamides, methacrylamides, allyl compounds, vinyl ethers, and vinyl esters can be exemplified.

Specifically, the following monomers can be exemplified.

Acrylates:

Methyl acrylate, ethyl acrylate, propyl acrylate, chloroethyl acrylate, 2-hydroxyethyl acrylate, trimethylol-propane monoacrylate, benzyl acrylate, methoxybenzyl acrylate, furfuryl acrylate, tetrahydrofurfuryl acrylate, etc.

Methacrylates:

Methyl methacrylate, ethyl methacrylate, propyl methacrylate, chloroethyl methacrylate, 2-hydroxyethyl methacrylate, trimethylolpropane monomethacrylate, benzyl methacrylate, methoxybenzyl methacrylate, furfuryl methacrylate, tetrahydrofurfuryl methacrylate, etc.

Acrylamides:

Acrylamide, N-alkylacrylamide (the alkyl group is an alkyl group having from 1 to 3 carbon atoms, e.g., a methyl group, an ethyl group, a propyl group), N,N-dialkylacrylamide (the alkyl group is an alkyl group having from 1 to 6 carbon atoms), N-hydroxyethyl-N-methylacrylamide, N-2-acetamido-ethyl-N-acetylacrylamide, etc.

Methacrylamides:

Methacrylamide, N-alkylmethacrylamide (the alkyl group is an alkyl group having from 1 to 3 carbon atoms, e.g., a methyl group, an ethyl group, a propyl group), N,N-dialkylmethacryl-amide (the alkyl group is an alkyl group having from 1 to 6 carbon atoms), N-hydroxyethyl-N-methylmethacrylamide, N-2-acetamidoethyl-N-acetylmethacrylamide, etc.

Allyl Compounds:

Allyl esters (e.g., allyl acetate, allyl caproate, allyl caprylate, allyl laurate, allyl palmitate, allyl stearate, allyl benzoate, allyl acetoacetate, allyl lactate, etc.), allyloxyethanol, etc.

Vinyl Ethers:

Alkyl vinyl ether (e.g., hexyl vinyl ether, octyl vinyl ether, decyl vinyl ether, ethyl hexyl vinyl ether, methoxy ethyl vinyl ether, ethoxy ethyl vinyl ether, chloroethyl vinyl ether, 1-methyl-2,2-dimethyl propyl vinyl ether, 2-ethyl butyl vinyl ether, hydroxyethyl vinyl ether, diethylene glycol vinyl ether, dimethylaminoethyl vinyl ether, diethylamino-ethyl vinyl ether, butylaminoethyl vinyl ether, benzyl vinyl ether, tetrahydrofurfuryl vinyl ether, etc.), etc.

Vinyl Esters:

Vinyl butyrate, vinyl isobutyrate, vinyl trimethyl acetate, vinyl diethylacetate, vinyl valate, vinyl caproate, vinyl chloroacetate, vinyl dichloroacetate, vinyl methoxy-acetate, vinyl butoxyacetate, vinyl lactate, vinyl β-phenylbutyrate, vinyl cyclohexylcarboxylate, etc.

Dialkyl Itaconates:

Dimethyl itaconate, diethyl itaconate, dibutyl itaconate, etc.

Dialkyl or Monoalkyl Fumarates:

Dibutyl fumarate, etc.

In addition to the above, crotonic acid, itaconic acid, acrylonitrile, methacrylonitrile, maleylonitrile, styrene, etc., are exemplified.

The amount of the polymerization unit of a fluoro-aliphatic group-containing monomer represented by formula (3) in the copolymers, is preferably 90 mass % or less of the total polymerization units constituting the copolymers, more preferably 80 mass % or less, and still more preferably 70 mass % or less.

The mass average molecular weight of the polymer comprising a fluoro-aliphatic group-containing monomer represented by formula (3) is preferably from 1,000 to 100,000, more preferably from 1,500 to 80,000, and still more preferably from 2,000 to 60,000.

The mass average molecular weight is a molecular weight detected and analyzed with a GPC analyzer using columns of TSKgel GMHxL, TSKgel G4000HxL, and TSKgel G2000HxL (trade names, manufactured by TOSO CORPORATION), a solvent (THF), and a differential refractometer, and expressed in terms of polystyrene.

The polymer comprising a fluoro-aliphatic group-containing monomer represented by formula (3) can be manufactured according to well-known methods. For example, the polymer can be manufactured by polymerizing the above described monomers, e.g., (meth)acrylate having a fluoro-aliphatic group, (meth)acrylate having a straight chain, branched or cyclic alkyl group, etc., in an organic solvent by the addition of a general purpose radical polymerization initiator. Alternatively, according to cases, the polymer can be manufactured by adding other addition polymerizable unsaturated compound and by the same method as above. A drip polymerization method of performing polymerization while dripping a monomer and an initiator in a reaction vessel according to the polymerizability of each monomer is also effective for the purpose of obtaining a polymer having a uniform composition Silane Coupling Agent:

As the silane coupling agents represented by formula (1), the hydrolyzed products of the silane coupling agents and the condensation reaction products of the hydrolyzed products, the compounds represented by formula (1), hydrolyzed products of the silane coupling agents and the condensation reaction products of the hydrolyzed products described above in the curable composition can be used.

Fine Particles:

At least any one of inorganic and organic fine particles may be used in a hard coat layer. By the use of fine particles, the refractive index of a hard coat layer can be brought into the later-described range.

The particle size of fine particles is preferably from 0.01 to 1 μm, more preferably from 0.01 to 0.5 μm, and especially preferably from 0.01 to 0.3 μm. When the particle size is in this range, the transparency of a coated film is not impaired and preferred.

Light Transmitting Beads:

A film in the invention, in particular an antiglare layer and a hard coat layer, can contain various kinds of light transmitting bead particles to impart an antiglare property (a surface scattering property) and an inside scattering property.

The light transmitting particles may be organic particles or may be inorganic beads. The less the particle size distribution, the less is the distribution of scattering characteristics, so that the design of the haze value is easy. Plastic beads are preferred as the light transmitting beads.

Inorganic Beads:

As inorganic beads, silica beads (refractive index: 1.44), agglomerated silica beads (refractive index: 1.48), alumina beads (refractive index: 1.63), zirconia beads, titania beads, and inorganic beads having hollows and minute pores are exemplified.

The use amount of the inorganic beads is preferably 1 to 30 mass parts per 100 mass parts of the resin, and more preferably from 3 to 20 mass parts. In a coating containing the inorganic beads, it is necessary to stir and sufficiently disperse the inorganic beads settled in the coating since the amount of beads settled increases with time. Since the primary particle of agglomerated beads has a particle size in submicron order, the agglomerated beads are hard to be settled and are more preferable, compared with other inorganic beads having no agglomerating property.

Resin Beads:

Resin beads having a refractive index of from 1.40 to 1.60 can be used in a hard coat layer. By using resin beads, a glare shield property can be imparted to a hard coat layer in addition to a hard coat property.

A preferred reason that the refractive index of resin beads is in this range is that the refractive indexes of resins used in a hard coat layer, in particular the refractive indexes of acrylate or methacrylate resins, are generally in the range of from 1.45 to 1.55, so that transparency of a coated film is not impaired and yet it is possible to impart a glare shield property to a hard coat layer by selecting resin beads having the nearest possible refractive index to the refractive indexes of these resins. As resin beads having a refractive index near to the refractive indexes of these resins, e.g., crosslinked polymethyl methacrylate beads (1.49), polycarbonate beads (1.58), crosslinked polystyrene beads (1.61), polyacryl-styrene beads (1.57), polyvinyl chloride styrene (1.54) are exemplified, but those other than these resin beads can also be used if they have a refractive index in the above range.

Resin beads having a particle size of from 3 to 8 μm are preferably used, and the use amount is from 2 to 20 mass parts per 100 mass parts of the resin, and preferably from 5 to 15 mass parts. When such resin beads are mixed in a coating, it is necessary to sufficiently stir and disperse the resin beads settled at the bottom of a vessel in using the coating. To do away with such an inconvenience, silica beads having a particle size of 0.5 μm or less, preferably from 0.1 to 0.25 μm, can be contained in the coating as a suspending agent of the resin beads. The more the silica beads are added, the more effective is the prevention of the settlement of the organic filler, but is maleficent to the transparency of the coated film. Accordingly, the amount is preferably less than 0.1 mass parts or so per 100 mass parts of the resin, which amount cannot impair the transparency of the coated film and can prevent the settlement as well.

Other Additives:

Additives such as a leveling agent, a thixotropic agent, an antistatic agent, etc., can be used in a hard coat layer.

Forming Method of Hard Coat Layer:

A hard coat layer can be formed by a crosslinking reaction or a polymerization reaction of a compound contained in a curable composition (e.g., the above polyfunctional monomers and polyfunctional oligomers) by the irradiation with heat or ionizing radiation.

It is preferred to perform the crosslinking reaction or polymerization reaction in the atmosphere of oxygen concentration of 3 vol % or less. By performing the reaction in the atmosphere of oxygen concentration of 3 vol % or less, a hard coat layer having excellent physical strength and chemical resistance can be formed. It is preferred to form a hard coat layer in the atmosphere of oxygen concentration of 1 vol % or less by a crosslinking reaction or a polymerization reaction of an ionizing radiation-curable compound, the oxygen concentration is more preferably 0.5 vol % or less, and especially preferably 0.1 vol % or less.

For making oxygen concentration 3 vol % or less, it is preferred to replace the atinosphere (nitrogen concentration: about 79 vol %, oxygen concentration: about 21 vol %) with other gas, especially preferably to replace with nitrogen (nitrogen purge).

It is preferred to perform irradiation with heat or ionizing radiation in the atmosphere of oxygen concentration of 3 vol % or less for 0.3 seconds or more. The time of irradiation is more preferably from 0.3 to 60 seconds from the beginning of irradiation, and more preferably from 0.5 to 10 seconds. The irradiation time of less than 0.3 seconds cannot complete curing reaction, so that sufficient curing cannot be done.

When a resin composition for forming a hard coat layer capable of curing with at least any means of heat and ionizing radiation contains an unsaturated double bond, it is preferred that 10% or more in amount of the double bond before curing is still existent in laminating an antireflection film on the surface of the hard coat layer, more preferably 15% or more, and especially preferably 20% or more. When the uncured double bond is in the above range, the interfacial adhesion between the hard coat layer and the antireflection layer formed on the surface of the hard coat layer is raised, so that high scratch resistance can be obtained.

As another method of heightening interfacial adhesion of a hard coat layer and an antireflection layer, there is a method of performing surface treatment before coating the curable composition of an antireflection layer on a hard coat layer. As the surface treatment of a hard coat layer, a high frequency plasma discharge method, an electron beam method, an ion beam method, a vacuum evaporation method, a sputtering method, an alkali treating method, an acid treating method, a corona discharge treatment, and an air pressure glow discharge plasma method can be exemplified. Alkali treatment is particularly effective. As the alkali aqueous solutions for use in alkali treatment, e.g., aqueous solutions of sodium hydroxide and potassium hydroxide, and alkali aqueous solutions of further adding various kinds of organic solvents, such as alcohols thereto can be exemplified. As the conditions of alkali treatment, e.g., when a sodium hydroxide aqueous solution is used, it is preferred to use the aqueous solution in concentration of from 0.1 to 10N, and more preferably in concentration of from 1 to 2N. The temperature of an alkali aqueous solution is from 0 to 100° C., and preferably from 20 to 80° C. The time of alkali treatment is from 0.01 to 10 hours, and preferably from 0.1 to 1 hour.

As the coating solvent, ketone solvents are preferably used. By using ketone solvents, the adhesion of the surface of a transparent support (in particular, a triacetyl cellulose support) and a hard coat layer is further improved. Especially preferred coating solvents are methyl ethyl ketone, methyl isobutyl ketone, and cyclohexanone. The coating solvent may contain solvents other than ketone solvents. It is preferred that the content of ketone solvents is 10 mass % or more of all the solvents contained in the coating composition, the content of ketone solvents is more preferably 20 mass % or more, and still more preferably 30 mass % or more.

A hard coat layer may be provided directly on the surface of a transparent support, or other layer may intervene between a transparent support and a hard coat layer, but for imparting physical strength to an antireflection film, it is preferred for a hard coat layer to be provided directly on a transparent support.

Physical Properties of Hard Coat Layer:

The hardness of a hard coat layer is preferably HB or higher by a pencil hardness test according to JIS K5400, and more preferably H or higher. In a taper test according to JIS K5400, the abrasion loss of a sample piece before and after the test is preferably as small as possible.

The refractive index of a hard coat layer in the invention is preferably from 1.47 to 1.65, and more preferably from 1.49 to 1.62.

Antistatic Layer:

An antireflection film in the invention is preferably provided with an antistatic layer for antistatic prevention on the surface of the film. An antistatic layer can be formed by well-known methods, e.g., a method of coating a coating solution comprising a composition containing conductive fine particles and a reactive curable resin for forming an electrically conductive layer, and a method of forming an electrically conductive thin film by evaporating or sputtering a metal a metallic oxide for forming a transparent film can be used.

An antistatic layer can be formed directly on a transparent support, or can be formed via a primer layer for strengthening the adhesion with a transparent support. When an antistatic layer is used as a layer near to the outermost layer in the constitution of an antireflection film, a sufficient antistatic property can be obtained, even though the thickness of the film is thin. A coating method is not especially restricted, and it is sufficient to select an optimal method from, e.g., roll coating, gravure coating, bar coating, and extrusion coating. It is also preferred to adjust the refractive index of an antistatic layer to use as a layer serving both as a middle refractive index layer and a high refractive index layer.

The thickness of an antistatic layer is preferably from 0.01 to 10 μm, more preferably from 0.03 to 7 μm, and still more preferably from 0.05 to 5 μm.

The surface resistivity of an antistatic layer is preferably from $10^5$ to $10^{12}$ Ω/□, and more preferably from $10^5$ to $10^{11}$ Ω/□. By providing an antistatic layer in order to make surface resistance value log SR of the antireflection film 12 or less is preferred in the point of preventing dusts from adhering on the surface of the antireflection film, and log SR of 11 or less is more preferred. The surface resistivity of an antistatic layer can be measured with a super insulation resistance/microammeter "TR8601" (manufactured by ADVANTEST CORPORATION) at 25° C. 60% RH.

An antistatic layer is preferably substantially transparent. Specifically, the haze of an antistatic layer is preferably 10% or less, more preferably 5% or less, still more preferably 3% or less, and most preferably 1% or less. The transmittance of light at wavelength of 550 nm is preferably 50% or more, more preferably 60% or more, still more preferably 65% or more, and most preferably 70% or more.

It is preferred for an antistatic layer to have high hardness, and the specific hardness of an antistatic layer is preferably H or higher by a pencil hardness test (in accordance with the provision of JIS K5400) with a load of 1 kg, more preferably 2H or higher, still more preferably 3H or higher, and most preferably 4H or more.

Electrically Conductive Fine Particles:

It is preferred for an electrostatic layer to contain electrically conductive fine particles. The electrically conductive fine particles are preferably inorganic particles comprising oxides or nitrides of metals. The examples of oxides or nitrides of metals include tin oxide, indium oxide, zinc oxide, and titanium nitride. A tin oxide and an indium oxide are especially preferred.

The electrically conductive fine particles comprise these oxides or nitrides of metals as main components and may further contain other elements. The main component means a component that is the most in content (mass %) of the components constituting the particles. The examples of other elements include Ti, Zr, Sn, Sb, Cu, Fe, Mn, Pb, Cd, As, Cr, Hg, Zn, Al, Mg, Si, P, S, B, Nb, In, V and halogen atoms. For increasing electrical conductivity of a tin oxide and an indium oxide, it is preferred to add Sb, P, B, Nb, In, V and halogen atoms to these oxides. A tin oxide containing Sb (ATO) and an indium oxide containing Sn (ITO) are especially preferred. The proportion of Sb in ATO is preferably from 3 to 20 mass %. The proportion of Sn ITO is preferably from 5 to 20 mass %.

A primary particle size of the electrically conductive fine particles for use in an electrostatic layer is preferably from 1 to 150 nm, more preferably from 5 to 100 nm, and most preferably from 5 to 70 nm. The average particle size of the electrically conductive fine particles in an antistatic layer to be formed is from 1 to 200 nm, preferably from 5 to 150 nm, more preferably from 10 to 100 nm, and most preferably from 10 to 80 nm. The average particle size of the electrically conductive fine particles is an average diameter with the mass of the particles as the weight, and this can be measured according to a light scattering method and with electron micrographs.

The specific surface area of the electrically conductive fine particles is preferably from 10 to 400 m²/g, more preferably from 20 to 200 m²/g, and most preferably from 30 to 150 m²/g.

The electrically conductive fine particles may be surface treated. Inorganic compounds or organic compounds are used in surface treatment. The examples of inorganic compounds for use in surface treatment include alumina and silica. Silica treatment is especially preferred. The examples of organic compounds for use in surface treatment include polyol, alkanolamine, stearic acid, a silane coupling agent and a titanate coupling agent. A silane coupling agent is most preferred. Two kinds or more surface treatments may be performed in combination.

The configurations of the electrically conductive fine particles are preferably ellipsoidal, spherical, cubic, spindle-like, or amorphous. Two or more kinds of electrically conductive fine particles may be used in combination in an electrostatic layer.

The proportion of the electrically conductive fine particles in an antistatic layer is preferably from 20 to 90 mass %, more preferably from 25 to 85 mass %, and still more preferably from 30 to 80 mass %.

The electrically conductive fine particles are used in the formation of an antistatic layer in a state of dispersion.

As a dispersion medium, it is preferred to use a liquid having a boiling point of from 60 to 170° C. As the examples of dispersion media, water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), and ether alcohols (e.g., 1-methoxy-2-propanol) are exemplified. Toluene, xylene, methyl ethyl ketone, methyl isobutyl ketone, cyclohexanone and butanol are especially preferred.

The electrically conductive fine particles can be dispersed in a dispersion medium with a disperser. The examples of dispersers include a sand grinder mill (e.g., beads mill with pins), a high speed impeller, a pebble mill, a roller mill, an attritor, and a colloid mill. A sand grinder mill and a high speed impeller mill are especially preferred. Pre-dispersion treatment may be carried out. Dispersers such as a ball mill, a three-roll mill, a kneader and an extruder are used in pre-dispersion treatment.

Transparent Support:

The light transmittance of a transparent support is preferably 80% or more, and more preferably 86% or more. The haze of a transparent support is preferably 2.0% or less, and more preferably 1.0% or less. The refractive index of a transparent support is preferably from 1.4 to 1.7.

The materials of a transparent support are not especially restricted, but plastic films are preferred to a glass plate. The examples of the materials of plastic films include cellulose ester (e.g., cellulose triacetate, cellulose diacetate, cellulose propionate, cellulose butyrate, cellulose acetate propionate, nitro cellulose), polyamide, polycarbonate, polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g. syndiotactic polystyrene), polyolefin (e.g., polypropylene, polyethylene, polymethylpentene), polysulfone, polyether sulfone, polyallylate, polyether imide, polymethyl methacrylate and polyether ketone. Cellulose ester, polycarbonate, polyethylene terephthalate and polyethylene naphthalate are preferred.

When a transparent support is used in a liquid crystal display, of the above cellulose esters, a film of cellulose acylate that is fatty acid ester of cellulose is preferably used. Cellulose acylate is manufactured by the esterification of cellulose. As the cellulose to be used, refined linters, kenafs and pulps are generally used.

As described, cellulose acylate in the invention is fatty acid ester of cellulose, and lower fatty acid ester is particularly preferred.

Here, lower fatty acid means fatty acid having 6 or less carbon atoms. Cellulose acylate having from 2 to 4 carbon atoms is preferred, and cellulose acetate is especially preferred. It is also preferred to use mixed fatty acid esters such as cellulose acetate propionate and cellulose acetate butyrate.

The viscosity average degree of polymerization (DP) of cellulose acylate is preferably 250 or more, and more preferably 290 or more. Further, it is preferred that the molecular weight distribution of Mw/Mn (Mw is a mass average molecular weight and Mn is a number average molecular weight) by gel permeation chromatography of cellulose acylate is narrow. The specific value of Mw/Mn is preferably from 1.0 to 5.0, more preferably from 1.0 to 3.0, and especially preferably from 1.0 to 2.0.

It is preferred to use cellulose acylate having a degree of acetylation of from 55.0 to 62.5% as a transparent support, more preferably from 57.0 to 62.0%, and especially preferably from 59.0 to 61.5%. A degree of acetylation means a bonding amount of acetic acid per a unitary mass of cellulose. A degree of acetylation can be measured according to the measurement and computation of a degree of acylation in ASTM D-817-91 (a test method of cellulose acylate).

In cellulose acylate, hydroxyls at the 2-, 3- and 6-positions are not equally substituted, but the degree of substitution at the 6-position is liable to be small. In the cellulose acylate for use in the invention, it is preferred that the degree of substitution at the 6-position is the same degree or larger as compared with the 2- and 3-positions. The rate of the degree of substitution at the 6-position to the sum total of the degree of substitution at the 2-, 3- and 6-positions is preferably from 30 to 40%, more preferably from 31 to 40%, and most preferably from 32 to 40%.

A cellulose acylate film is preferably used as a long size film, i.e., specifically a film having a length of from 100 to 5,000 m or so, and generally such a film is offered in a wound form. From the viewpoint of offering an antireflection film of high productivity, the width of a resin film support is preferably from 1.3 to 4 m.

The thickness of a transparent support is preferably from 10 to 85 μm, more preferably from 10 to 70 μm, and most preferably from 20 to 60 μm. When the thickness is less than the range, failures such as cutting and wrinkles are liable to occur in handling. While when more than the range, sufficient thinning cannot be achieved when stuck on a liquid crystal display.

Various kinds of additives can be used in a transparent support to adjust mechanical characteristics (the strength, curling, dimensional stability, sliding property of a film, etc.). For example, plasticizers (e.g., phosphoric esters, phthalic esters, esters of polyol and fatty acid, etc.), UV preventing agents (e.g., hydroxybenzophenone compounds, benzotriazole compounds, salicylate compounds, cyanoacrylate compounds, etc.), degradation preventing agents (e.g., antioxidants, peroxide decomposers, radical inhibitors, metal deactivators, acid scavengers, amines, etc.), fine particles (e.g., $SiO_2$, $Al_2O_3$, $TiO_2$, $BaSO_4$, $CaCO_3$, $MgCO_3$, talc, kaolin, etc.), releasing agents, antistatic agents, infrared absorbers, etc., are exemplified.

With respect to these additives, the materials described in detail in Hatsumei Kyokai Kokai Giho, Kogi No. 2001-1745, pp. 17 to 22 (published by Hatsumei Kyokai, Mar. 15, 2001), are preferably used. The addition amount of additives is preferably from 0.01 to 20 mass % of the transparent support, and more preferably from 0.05 to 10 mass %.

For ensuring good flatness, preventing tucking, and achieving sufficient transparency by the addition of a small amount of a matting agent, a method of using a multilayer structure comprising at least a base layer and a surface layer and adding a matting agent to the surface layer alone is known.

The surface layer may be stacked on one side alone of the base layer, or may be stacked on both sides. That is, as disclosed in FIG. 1 in JP-A-2001-71418, a multilayer may be a three-layer structure comprising base layer 1 having stacked on both sides surface layer 2, or may be a two-layer structure comprising base layer 1 having stacked on one side surface layer 2 as shown in FIG. 2 in the same patent. The surface layer is stacked at a place positioned on the surface, so that other layer may be stacked between the surface layer and the base layer.

In such a transparent support, a matting agent is added to the surface layer alone and not added to the base layer. That is, by adding a matting agent to the surface layer alone, the surface flatness of the transparent support and prevention of tucking can be ensured, and by not adding a matting agent to the base layer (when other layer is stacked between the base layer and the surface layer, the intermediate layer is also included), the transparency of the transparent support at large is ensured.

As matting agents, $SiO_2$, $TiO_2$, $BaSO_4$, $CaCO_3$, talc, kaolin, etc., are exemplified. As matting agents of inorganic compounds, for example, inorganic fine particles of barium sulfate, manganese colloid, titanium dioxide, strontium barium sulfate, silicon dioxide and the like are exemplified. Further, silicon dioxide such as synthetic silica, etc., obtained by a wet method or gelation of silicic acid, and titanium dioxide formed by titanium slug and sulfuric acid (a rutile type and an anatase type) are exemplified. Matting agents can also be obtained from inorganic matters having a relatively large particle size, e.g., 20 μm or more, by pulverization, and then classification (filtration by vibration, classification by wind force). As preferred matting agents of inorganic compounds, fine particles having electrical conductivity are exemplified. Specifically, fine particles of at least one crystallizable metallic oxide selected from among ZnO, $TiO_3$, $SnO_2$, $Al_2O_3$, $In_2O_3$, $SiO_2$, MgO, BaO and $MoO_3$, and fine particles of the composite oxides of these metallic oxides are exemplified.

As matting agents comprising polymer compounds, polytetrafluoroethylene, cellulose acetate, polystyrene, polymethyl methacrylate, polypropyl methacrylate, polymethyl acrylate, polyethylene carbonate, starch, etc., and pulverized and classified products of these polymer compounds are exemplified. Polymer compounds synthesized according to a suspension polymerization method, polymer compounds and inorganic compounds made spherical by a spray drying method or a dispersing method can also be used. Polymer compounds of one or two or more of the following shown monomer compounds that are made particles by various means can also be used as matting agents.

For example, acrylic esters, methacrylic esters, vinyl esters, styrenes, and olefins are preferably used. Further, particles having a fluorine atom or a silicon atom as disclosed in JP-A-62-14647, JP-A-62-17744, and JP-A-62-17743 may be used. Of these particles, preferably used particle compositions are polystyrene, polymethyl (meth)acrylate, polyethyl acrylate, poly(methyl methacrylate/methacrylic acid, 95/5 in molar ratio), poly(styrene/styrenesulfonic acid, 95/5 in molar ratio), polyacrylonitrile, poly(methyl methacrylate/ethyl acrylate/methacrylic acid, 50/40/10 in molar ratio), silica, and the like.

As described above, various inorganic compounds and polymer compounds can be used as matting agents, but when methylene chloride is used as a dispersion medium, inorganic compounds are preferably used as matting agents and silica ($SiO_2$) is especially preferred, since inexpensive and easily available.

The addition amount of a matting agent is preferably from 5 to 500 mg/m$^2$, and more preferably from 10 to 100 mg/m$^2$. When the addition amount of a matting agent is less than to 5 mg/m$^2$, it is difficult to secure a sliding property of a transparent support and prevent tucking, while when the addition amount exceeds 500 mg/m$^2$, transparency deteriorates.

The centerline average roughness of the surface layer of a transparent support is preferably from 0.01 to 5 μm, and more preferably from 0.1 to 1 μm. When the centerline average roughness of the surface layer is less than 0.01 μm, strain occur in the film and minute scratches are generated, while when the centerline average roughness exceeds 5 μm, flatness deteriorates.

A transparent support may be subjected to surface treatment. The examples of surface treatments include chemical treatment, mechanical treatment, corona discharge treatment, flame treatment, UV irradiation treatment, high frequency treatment, glow discharge treatment, active plasma treatment, laser treatment, mixed acid treatment, and ozone oxidation treatment. Specifically, the contents in Hatsumei Kyokai Kokai Giho Kogi No. 2001-1745 (published on Mar. 15, 2001), pp. 30 and 31, and JP-A-2001-9973 are exemplified.

The preferred surface treatments are glow discharge treatment, UV irradiation treatment, corona discharge treatment and flame treatment, and more preferred treatments are glow discharge treatment and UV irradiation treatment.

Other Layers:

An antireflection film in the invention may further be provided with a moisture proofing layer, an antistatic layer (an electrical conductive layer), a primer layer, an undercoat layer, a protective layer, a shield layer, a sliding layer, and a gas barrier layer. A shield layer is provided for the purpose of shielding electromagnetic waves and infrared rays.

Characteristics of Antireflection Film:

Photoelectron Spectral Intensity ratio Si/C:

In an antireflection film, it is preferred that the photoelectron spectral intensity ratio Si/C at the outermost surface of a low refractive index layer (an antireflection layer) is greater than at the 80% lower layer from the outermost surface by 2 times or more. More preferably, Si/C is greater at the outermost surface than at the 80% lower layer by 2.5 timnes or more, and still more preferably greater by 3 times or more.

The photoelectron spectral intensity ratio Si/C can be measured as follows. In the first place, the photoelectron spectral intensity ratio Si2p/C1s (=Si(a)) of Si2P, C1s of the outermost surface of an antireflection film measured with ESCA-3400 (manufactured by Shimadzu Corporation) (vacuum degree: $1 \times 10^{-5}$ Pa, X-ray source, target: Mg, voltage: 12 kV, electric current: 20 mA) is found, further, the photoelectron spectral intensity ratio Si2p/C1s (=Si(b)) of Si2P, C1s of the 80% louver layer from the surface, which is etched until the thickness of the low refractive index layer reaches ⅕ (±5%), measured with ion etching gun of the attachment of ESCA-3400 (ion gun, voltage: 2 kV, electric current: 20 mA) is found. The variations of respective intensity ratios Si(a)/Si(b) before and after etching are found from these values, and the surface segregation degree can be determined from the variation of Si2p/C1s ratio before and after etching (the photoelectron spectral intensity ratio at the outermost surface of the low refractive index layer/the photoelectron spectral intensity ratio in the vicinity of the surface to the 80% lower layer of the low refractive index layer).

With respect to C1s, the intensity was found at the position of peak of each photoelectron spectrum, and with respect to Si2p, the intensity at the position of peak coming from the Si atom of silicone (polydimethylsiloxane) (having bonding energy in the vicinity of 105 eV) was used in the computation of the intensity ratio to distinguish it from the Si atom coming from inorganic silica particles. Prior to measurement, a preliminary experiment of gradually etching the surface of a low refractive index layer is carried out beforehand on various etching conditions, and the conditions getting from the surface to the depth of 80% are found based on the etching conditions required to reach the lower hard coat layer.

When the characteristics of the surface alone are controlled, it is possible to selectively dispose a necessary component alone on the surface by arbitrarily using the surface segregated compound described in the specification of the invention, so that the characteristics of the inside and the characteristics of the surface of the film can be controlled independently.

Surface Haze and Glossiness:

The haze attributable to surface scattering of an antireflection film (also referred to as surface haze) and the glossiness are preferably the following (i) or (ii) according to purpose.
(i) The haze attributable to surface scattering is 3% or less and the glossiness at 60° is from 60 to 120%.
(ii) The haze attributable to surface scattering is 3.5% or more and the glossiness at 60° is from 20 to 80%.

The haze attributable to surface scattering (hereinafter referred to as surface haze) can be obtained as follows, taking the whole haze of an antireflection film as (H), the inside haze as (Hi), and the surface haze as (Hs).
(1) The whole haze value (H) of an obtained film is measured according to JIS-K7136.
(2) A few drops of silicone oil or liquid paraffin are dropped on the obverse of the low refractive index layer side of the obtained film and the reverse, the film is sandwiched between two glass plates (micro-slide glass, No. S 9111, manufactured by MATSUNAMI) having a thickness of 1 mm to completely optically stick two glass plates and the obtained film, and haze is measured in a state of excluding surface haze. Separately, silicone oil alone is inserted between two glass plates and haze is measured, and a computed value by subtracting this haze value from the above haze is taken as inside haze (Hi).
(3) A value obtained by subtracting the inside haze (Hi) computed in the above (2) from the whole haze value (H) measured in the above (1) is computed as the surface haze value (Hs).

Critical Load in Rubbing Test with Cotton Swab:

It is preferred that the critical load of the surface of an antireflection film of the invention in a rubbing test with a cotton swab after exposure to ozone of 10 ppm for 192 hours is preferably 400 g or more, more preferably 500 g or more, and still more preferably 600 g or more.

The critical load in a rubbing test with a cotton swab can be found as follows.

Each sample is processed to a polarizing plate, and after preservation of the polarizing plate in an atmosphere of ozone of 10 ppm, 30° C., 60% RH for 192 hours (8 days), the polarizing plate is taken out into the air. A cotton swab (Health Refle, a trade name, manufactured by TOYOEIZAI CORPORATION) is fixed at the tip of a rubbing part, the top and bottom of the sample are fixed with clips in a plain tray, the sample and the cotton swab are immersed in water at 25° C., and rubbing test of going and returning is performed 20 times with the cotton swab being applied with a load. A rubbing distance (one way) is 1 cm and a rubbing speed is about two goings and comings/second. The water on the surface of the sample is dried after the rubbing test, and whether the film is peeled or not is visually observed. The same sample is tested ten times repeatedly, and until film peeling occurs five times or more, the initial load of 100 g is increased by 50 g at a time. The load by which film peeling occurred less than five times in ten times of tests is defined as a critical load. Film peeling is visually judged depending upon whether the reflection state of the surface is changed or not. A film that is changed in reflection state is reduced in thickness of the uppermost layer by 5% or more when the section is observed with an electron microscope, or the uppermost layer or other layers have been peeled off.

Manufacturing Method of Antireflection Film:

The embodiments of the manufacturing methods of an antireflection film in the invention will be described below. The invention is not limited to the methods below.

Preparation of Composition and Coating:

In the first place, a composition for forming each layer constituting an antireflection film is prepared and resulting each composition is coated on a support. As coating methods, a dip coat method, an air knife coat method, a curtain coat method, a roller coat method, a wire bar coat method, a gravure coat method, and a die coat method are preferably used, a gravure coat method, a wire bar coat method, and a die coat method are more preferred, and a die coat method is especially preferred.

In coating each composition, it is preferred to use a die coater as shown in FIG. 1. In coater 10 as shown in FIG. 1, by the coating of coating solution 14 as beads 14a from slot die 13 on web 12 continuously travels by being supported with backup roll 11, coating film 14b is formed on web 12.

Pocket 15 and slot 16 are formed on the inside of slot die 13. The cross-section of pocket 15 is composed of a curve and a straight line, this may be almost circular as shown in FIG. 1, or may be semicircular. Pocket 15 is a space of liquid reservoir of a coating solution extending in the width direction of slot die 13 with the sectional form, and the effective extending length is generally equal to the coating width or a little longer.

Coating solution 14 is supplied to pocket 15 from the side of slot die 13, or from the central part of the side opposite to slot opening 16a. A stopper is provided on pocket 15 to prevent coating solution 14 from leaking.

Slot 16 is a channel of coating solution 14 from pocket 15 to web 12 having the sectional form in the width direction of slot 13 similarly to pocket 15. Opening 16 a positioned on the web side is adjusted with something like a width regulating plate not shown in the figure so that the width is almost the equal length to the coating width. The angle formed by backup roll 11 and the tangential line in the traveling direction of the web at the slot tip of slot 16 is preferably from 30° to 60°.

Tip lip 17 of slot die 13 where opening 16a of slot 16 is positioned is in a tapered form, and the tip is flat 18 called the land. Of land 18, the upstream side of the traveling direction of web 12 to slot 16 is called upstream side lip land 18a, and the downstream side is called downstream side lip land 18b.

Figure 2A:
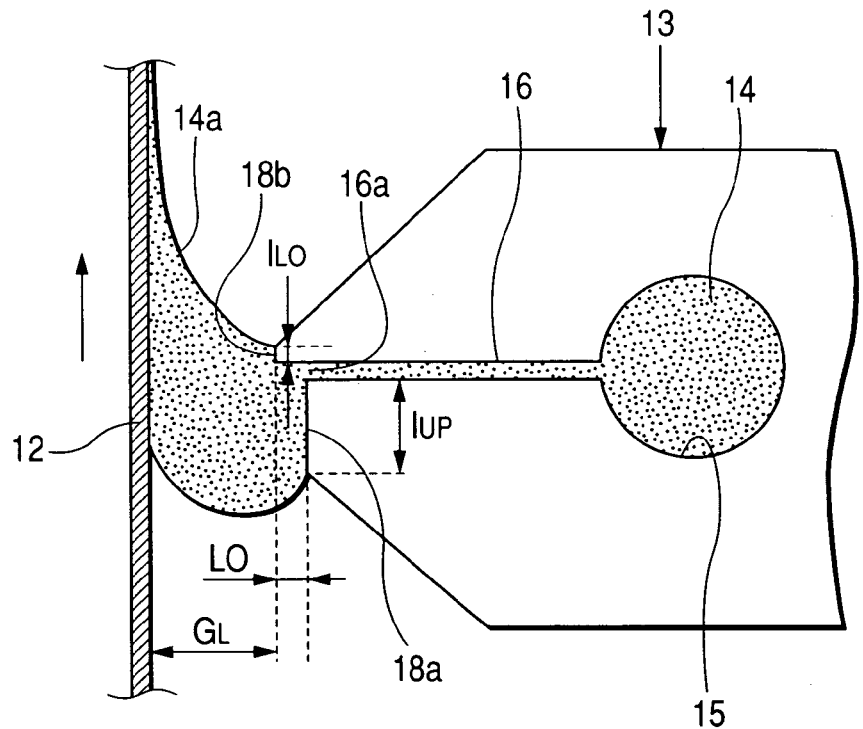
FIGS. 2A and 2B are views showing the cross-section of slot die 13 shown in FIG. 1.
Figure 2B:
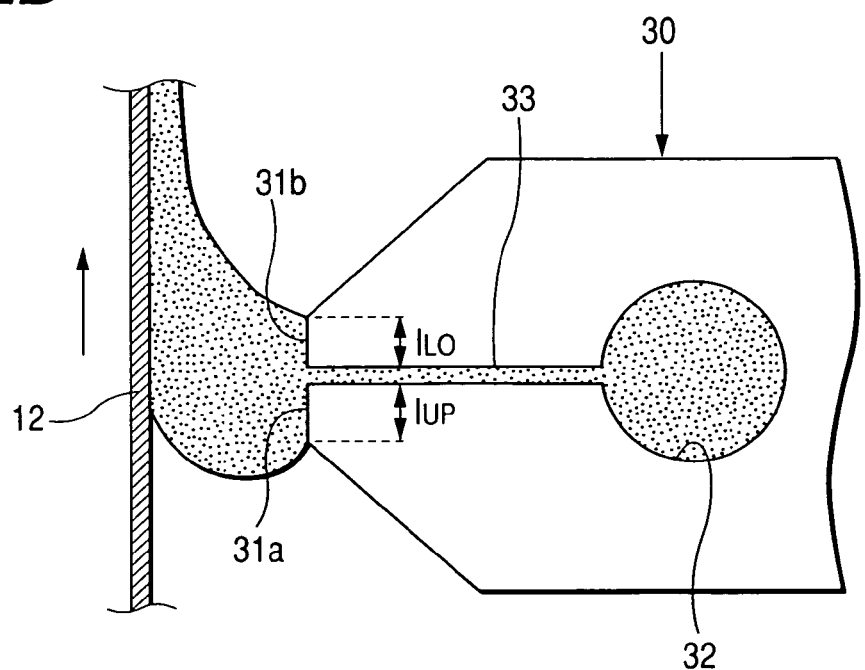

FIGS. 2A and 2B are views showing the cross-section of slot die 13 in comparison with a slot die in the related art. FIG. 2A shows slot die 13 in FIG. 1, and FIG. 2B shows related art slot die 30. In related art slot die 30, the distances from upstream side lip land 31a and downstream side lip land 31b to web 12 are equal. Incidentally, in FIG. 2B, 32 shows a pocket and 33 slot. On the other hand, in slot die 13, downstream side lip land length ILO is shorter than upstream side lip land length, by which coating of a wet film thickness of 20 µm or lower can be accurately performed.

Land length IUP of upstream side lip land 18a is not especially restricted but the range of from 100 µm to 1 mm is preferably used. Land length ILO of downstream side lip land 18b is from 30 to 100 µm, preferably from 30 to 80 µm, and more preferably from 30 to 60 µm.

When land length ILO of downstream side lip land is shorter than 30 µm, the edge of tip lip 17 or the land is liable to chip and streak is liable to occur in a coated film, as a result coating is impossible. Further, setting of wet line position on the downstream side is difficult and the coating solution is liable to run on the downstream side. This wet spreading of the coating solution on the downstream side means the lack of uniformity of the wet line, which leads to the occurrence of inferior forms such as streaks on the coated surface, as well known.

On the other band, when land length ILO of downstream side lip land is longer than 100 µm, beads themselves cannot be formed, so that it is impossible to perform thin layer coating.

Further, downstream side lip land 18b is in close vicinity to web 12 as compared with upstream side lip land 18a, and takes the overbite shape, so that the degree of pressure reduction can be lowered and bead formation that is suitable for thin layer coating is possible. The difference in distance between downstream side lip land 18b and upstream side lip land 18a respectively and web 12 (hereinafter referred to as overbite length LO) is preferably from 30 to 120 µm, more preferably from 30 to 100 µm, and most preferably from 30 to 80 µm.

When slot die 13 takes the overbite shape, gap GL between tip lip 17 and web 12 means the gas between downstream side lip land 18b and web 12.

Figure 3:
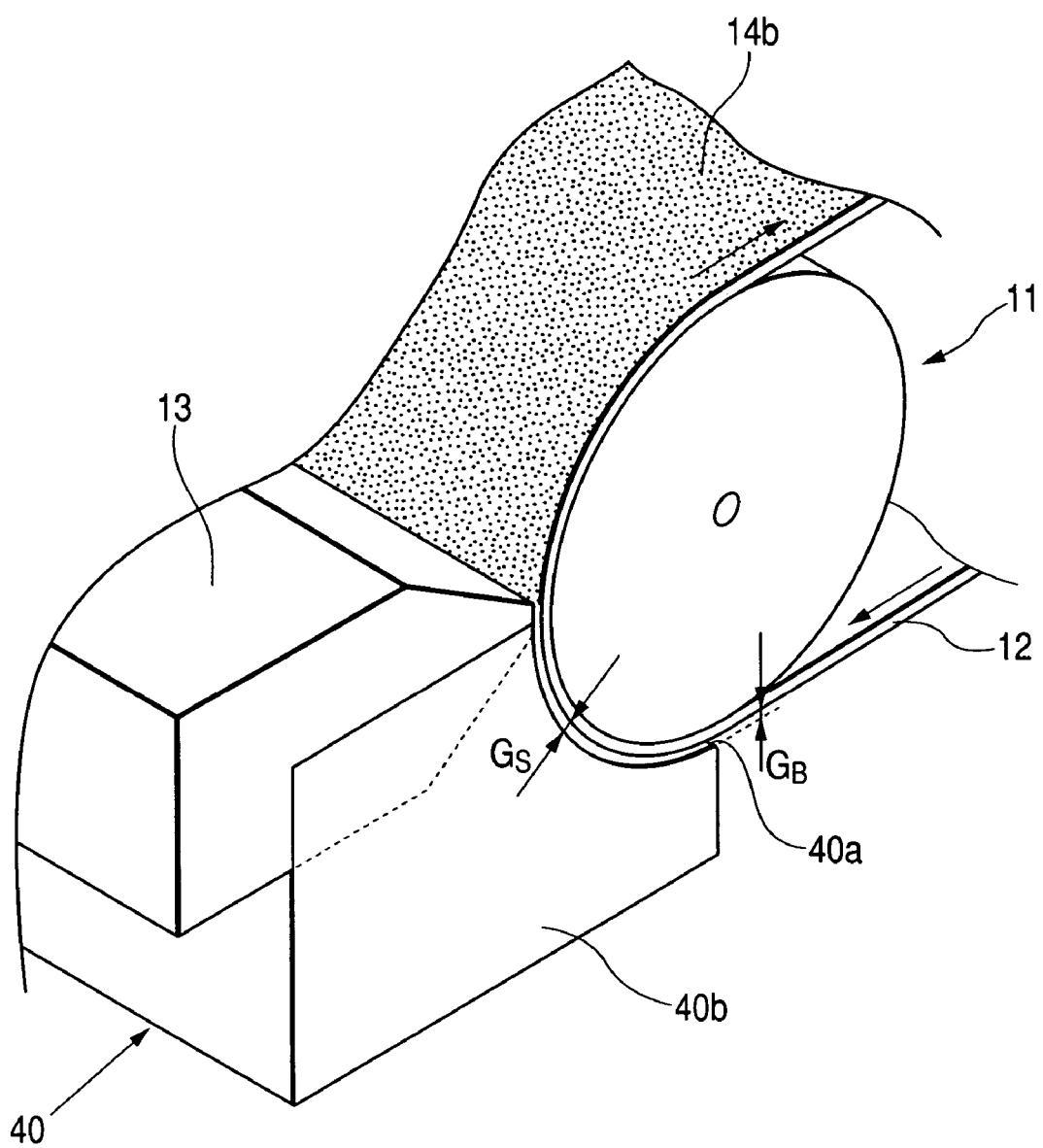
FIG. 3 is an oblique view showing slot die 13 shown in FIG. 1.

FIG. 3 is an oblique view showing slot die 13 shown in FIG. 1 and the periphery. On the opposite side to the traveling direction side of web 12, pressure reducing chamber 40 is provided in the position not being brought into contact web 12, so that sufficient adjustment of pressure reduction can be done to bead 14a. Pressure reducing chamber 40 is equipped with back plate 40a and side plate 40b for maintaining the operation efficiency, and gap GB and gap GS are present between back plate 40a and web 12, and side plate 40b and web 12, respectively.

Figure 4:
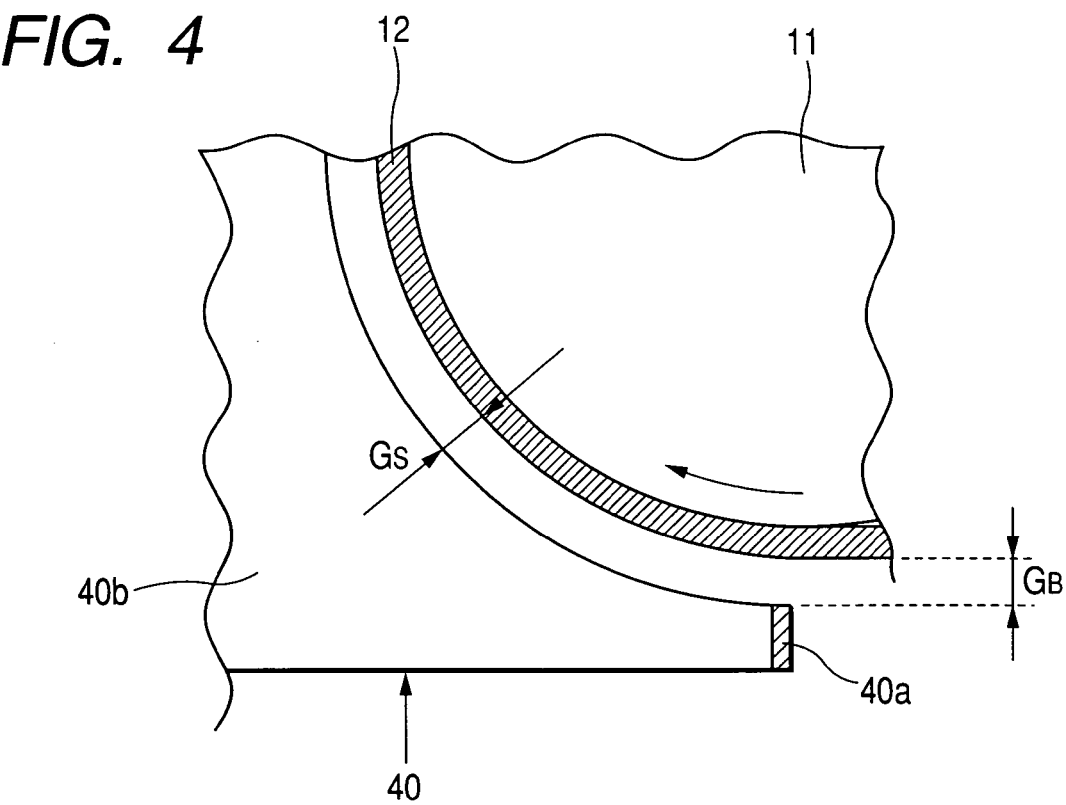
FIG. 4 is a cross-sectional view showing pressure reducing chamber 40 and web 12.
Figure 5:
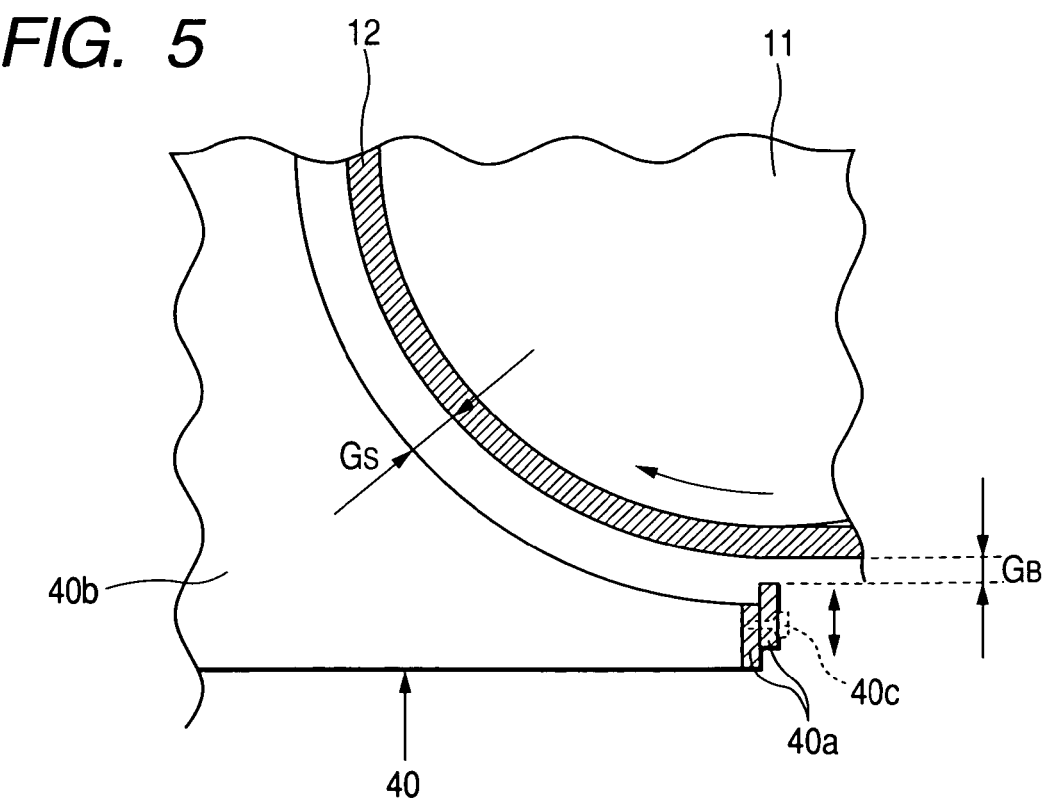
FIG. 5 is a cross-sectional view showing pressure reducing chamber 40 and web 12.

FIGS. 4 and 5 are cross-sectional views showing pressure reducing chamber 40 and web 12 in close vicinity. Side plate 40b and back plate 40a may be integrated with the pressure reducing chamber itself as shown in FIG. 4, or may take a structure of being fixed to the chamber with screw 40c and the like so as to be capable of arbitrarily changing the gap as shown in FIG. 5.

What a structure it may be, spaces actually present between back plate 40a and web 12 and between side plate 40b and web 12 are defined as gap GB and gap GS, respectively. When pressure reducing chamber 40 is provided on the lower side of web 12 and slot die 13 as in FIG. 3, gap GB between back plate 40a of pressure reducing chamber 40 and web 12 means the gas from the uppermost end of back plate 40a to web 12.

It is preferred to make gap GB between back plate 40a and web 12 greater than gap GL between tip lip 17 of slot die 13 and web 12, by which the variation of pressure reduction degree in the vicinity of the beads attributable to the eccentricity of backup roll 11 can be restrained.

For example, when gap GL between tip lip 17 of slot die 13 and web 12 is from 30 to 100 µm, gap GB between back plate 40a and web 12 is preferably from 100 to 500 µm.

The longer the length of tip lip 17 in the web traveling direction on the traveling direction side of web 12, the more unfavorable is it for bead formation. If the length becomes uneven between arbitrary positions in the slot die breadth direction, bead becomes unstable by slight disturbance. Accordingly, it is preferred that the breadth of fluctuation of the length in the slot die width direction is within 20 µm.

When tip lip 17 of the slot die is made of a material such as stainless steel, tip lip 17 is dulled in the die processing stage, so that the accuracy of tip lip 17 cannot be satisfied even when the length of tip lip 17 of the slot die in the web traveling direction is from 30 to 100 µm.

Accordingly, for maintaining high processing accuracy, it is important to use super hard materials as disclosed in Japanese Patent 2817053. Specifically, it is preferred that at least tip lip 17 of a slot die is made of a super hard alloy comprising bonded carbide crystals having an average particle size of 5 µm or less.

As the super hard alloy, those obtained by combining carbide crystal particles such as tungsten carbide (hereinafter referred to as WC) with a combining metal such as cobalt are exemplified. As combining metals, titanium, tantalum, niobium and mixed metals of these metals can also be used besides the above. The average particle size of WC crystals is preferably 3 µm or less.

For realizing highly accurate coating, the land length of tip lip 17 on the web traveling direction side and the fluctuation of the gap between tip lip 17 and the web in the slot die width direction are also important factors. The combination of these two factors, that is, it is desired to achieve straightness in the range capable of restraining the fluctuation breadth of gap to a certain degree. It is preferred to have straightness of tip lip 17 and backup roll 11 so that the fluctuation breadth of gap in the slot die width direction is 5 µm or less.

Curing Treatment:

After coating a composition for forming each layer on a support as above, curing treatment by at least any means of heating and light irradiation is performed. Coating and curing treatment are repeated with each layer in this manner and a hard coat layer, a low refractive index layer, etc., are stacked on the support. Further, after multilayer coating, all the layers simultaneously multilayer-coated may be subjected to curing treatment at the same time.

To suppress coloration, decomposition and deformation of a transparent support, the temperature is preferably 150° C. or less in a case of heat curing treatment, and in a case of light irradiation, the irradiation dose is preferably 1,000 mJ/cm$^2$. Further, it is also preferred to perform photo-curing treatment after heat curing treatment, or perform heat treatment at the latter half of photo-curing treatment. In particular in a low refractive index layer, photo-curing treatment after heat curing treatment, or heat treatment at the latter half of photo-curing treatment is preferred.

Further, for heightening layer adhesion between an upper layer and a lower layer, it is preferred that a lower layer is half-cured in a range that does not influence antireflection performances, and full curing is performed after coating an upper layer.

The light source in light irradiation may be any of an ultraviolet ray region and a near infrared ray region. As the light sources of ultraviolet rays, extra-high pressure, high pressure, middle pressure and low pressure mercury lamps, a chemical lamp, a carbon arc lamp, a metal halide lamp, a xenon lamp and sunbeams are exemplified. Available various kinds of laser light sources of the wavelengths of from 350 to 420 nm may be made multi-beams for irradiation. As the light sources of near infrared rays, a halogen lamp, a xenon lamp and a high pressure sodium lamp are exemplified, and available various kinds of laser light sources of the wavelengths of from 750 to 1,400 nm may be made multi-beams for irradiation.

Near infrared light sources may be combined with ultraviolet light sources, or irradiation may be performed from the substrate surface side opposite to the coating side of a high reflective index layer, by which film curing in the depth direction in a coated layer progresses with the curing of the surface and the periphery without delay and a uniformly cured film can be obtained.

In a case of photo-radical polymerization with light irradiation, the polymerization can be carried out in the air or inert gas, but it is preferred to make the oxygen concentration in the atmosphere as low as possible for the purpose of shortening the induction period of polymerization of the radical polymerizable monomer, or sufficiently increasing the polymerization rate. The intensity of irradiation of ultraviolet rays is preferably from 0.1 to 100 mW/cm$^2$ or so, and the irradiation dose on the surface of a coated layer is preferably from 10 to 1,000 mJ/cm$^2$. The temperature distribution of a coated layer in a light irradiation process is preferably controlled to be uniform as far as possible, preferably within ±3° C., more preferably within ±1.5° C. In this range of the temperature, the polymerization reaction in the in-plane direction and depth direction in the layer uniformly progresses.

The above processes may be performed every time when each layer is formed, or formation of each layer can be carried out continuously by providing a plurality of coating unit— drying chamber—radiation curing part—heat curing chamber. From the aspect of productivity, it is preferred to form each layer continuously.

Curing by any means of heating and light irradiation can be performed by irradiation with ionizing radiation or heating in the presence of a photo-radical polymerization initiator or a thermal radical polymerization initiator.

As the photo-radical polymerization initiators, acetophenones, benzoins, benzopheniones, phosphine oxides, ketals, anthraquinone, thioxanthones, azo compounds, peroxides, 2,3-dialkyldione compounds, disulfide compounds, fluoroamine compounds and aromatic sulfoniums are exemplified. The examples of acetophenones include 2,2-diethoxy-acetophenone, p-dimethylacetoplhenioiie, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpliolinophenyl)butanone.
The examples of benzoins include benzoylbenzenesulfonic ester, benzoin-toluenesulfonic ester, benzoin methyl ether, benzoin ethyl ether and benzoin isopropyl ether. The examples of benzophenones include benzophenone, 2,4-dichlorobenzophenone, 4,4-dichlorobenzophenone and p-chlorobenzophenone. The examples of phosphine oxides include 2,4,6-trimethylbenzoyl-diphenylphosphine oxide.

Various examples of photo-radical polymerization initiators are described in *Saishin UV Koka Giiutsu* (*The Latest Techniques of UV Curing*), p. 159, representative publisher, Kazuhiro Takasusuki, published by Joho Gijutsu Kyokai (1991), and these compounds can be used in the invention.

As commercially available photo-cleavage type photo-radical polymerization initiators, Irgacure 651, 184, 819 and OXEOI (manufactured by Ciba Specialty Chemicals Inc.) can be preferably used in the invention.

Photo-polymerization initiators are preferably used in an amount of from 0.1 to 15 mass parts per 100 mass parts of the polyfunctional monomer, and more preferably from 1 to 10 mass parts.

A photosensitizer may be used in addition to a photopolymerization initiator. The specific examples of photo-sensitizers include n-butylamine, triethylainine, tri-n-butylphospine, Michler's ketone and thioxanthone.

As the thermal radical polymerization initiators, organic or inorganic peroxides, organic azo and diazo compounds can be used.

Specifically, the examples of organic peroxides include benzoyl peroxide, halogen benzoyl peroxide, lauroyl peroxide, acetyl peroxide, dibutyl peroxide, cumene hydroperoxide, and butyl hydroperoxide, the examples of inorganic peroxides include hydrogen peroxide, ammonium persulfate, and potassium persulfate, the examples of azo compounds include 2,2'-azo-bis(isobutyronitrile), 2,2'-azobis(propionitrile), and 1,1 '-azobis(cyclohexanecarbonitrile), and the examples of diazo compounds include diazoaminobenzene and p-nitrobenzene-diazonium.

In the invention, the surface of a transparent support and/or a hard coat layer may be subjected to discharge treatment and/or radiation exposure for surface modification as above.

As the discharge treatment and radiation exposure, e.g., corona discharge treatment, glow discharge treatment, arc discharge treatment, plasma discharge treatment, ultraviolet irradiation treatment, and electron beam irradiation treatment are exemplified. Of these treatments, corona discharge treatment and ultraviolet irradiation treatment are preferred for the reasons that these treatments are simple and the treatment effects are high. By treating the surface of a hard coat layer with these surface modification treatments, the adhesion of the hard coat layer and the low refractive index layer can be heightened and durability of the antireflection film can be improved.

(3) Polarizing Plate

A polarizing plate in the invention has an antireflection film of the invention at least on one side of the protective film (the protective film for a polarizing plate) of a polarizer. By using an antireflection film of the invention as the protective film for a polarizing plate, a polarizing plate having antireflection functions excellent in physical strength and weather resistance can be formed, so that the manufacturing costs can be-greatly reduced and thinning of a display device is possible.

It is more preferred to use an antireflection film of the invention on one side of the protective film of a polarizing plate, and the later-descried optical compensation film having an optically anisotropic layer on the other side of the protective film for a polarizing plate. In addition to the above-described characteristics, such a polarizing plate can improve the contrast of a liquid crystal display in a bright room and greatly widen the angle of visibility of up and down and left and right.

Protective Film for Polarizing Plate:

When an antireflection film of the invention is used as the protective film for a polarizing plate, it is preferred that the surface of the transparent support (the opposite side to the side on which the antireflection layer is provided) of the antireflection film is subjected to hydrophilization treatment, and to stick the hydrophilized surface on a polarizer. Similarly, it is also preferred that the surface of an optical compensation film that is stuck on a polarizer is subjected to hydrophilization treatment.

The hydrophilization treatment of the surface of a transparent protective film can be performed by well-known methods. For example, methods of modifying the surface of the film by corona discharge treatment, glow discharge treatment, UV irradiation treatment, flame treatment, ozone treatment, acid treatment and alkali saponification treatment are exemplified. These treatments are described in detail in the above Kogi No. 2001-1745, pp. 30 to 32.

Of these treatments, surface treatment of a cellulose acylate film with alkali saponification treatment is very effective.

A specific means of alkali saponification treatment can be selected from the following four means of (1) to (4). Of these means, means (1) is superior for capable of treatment with the same process as the process of general purpose triacetyl cellulose film, but there are problems in that even an antireflection film surface undergoes saponification treatment, so that the film is deteriorated due to alkali hydrolysis of the surface, and that the solution of saponification treatment, if remains, leads to stains. While means (2) can improve even the adhesion of a low refractive index layer and the lower layer in an antireflection film, and so preferred.

(1) After a low refractive index layer of an antireflection layer has been formed on a transparent support, the obverse and reverse of the antireflection film is subjected to saponification treatment by immersing the film in an alkali solution at least one time.
(2) Before a low refractive index layer is formed on a transparent support, the obverse and reverse of the transparent support having layers formed before a low refractive index layer is formed is subjected to saponification treatment by immersing the film in an alkali solution at least one time. According to this means, the surface of the transparent support to be provided with a low refractive index layer also undergoes alkali treatment.
(3) After a low refractive index layer of an antireflection layer has been formed on a transparent support, the surface having the low refractive index layer is protected with a layered product, and the reverse of the antireflection film is subjected to saponification treatment by immersing the film in an alkali solution at least one time.
(4) Before or after forming the layers constituting an antireflection layer on a transparent support, an alkali solution is coated on the side of the transparent support opposite to the side on which an antireflection layer is formed, and then the film is heated, washed and/or neutralized to subject the reverse alone of the antireflection film to saponification treatment.

In a protective film for a polarizing plate, the surface of a transparent support of the side opposite to the side having an antireflection layer, i.e., the surface of the side to be stuck on a polarizer, has the contact angle with water of from 20 to 50°.

Polarizer:

A polarizer is generally preferably a coating type polarizer represented by Optiva Inc., or a polarizer comprising a binder, and iodine or a dichroic dyestuff.

The iodine and dichroic dyestuff in a polarizer exhibit polarizing performance by being subjected to orientation in the binder. It is preferred that the iodine and dichroic dyestuff are oriented along the molecule of the binder, or the dichroic dyestuff is oriented in one direction by self-organization as liquid crystals.

Polarizers (polarizers) now on the market are generally manufactured by immersing a stretched polymer in a solution of an iodine or a dichroic dyestuff in a tub, and penetrating the iodine into the binder, or the dichroic dyestuff into the binder.

In commercially available polarizers, iodine or a dichroic dyestuff is distributed in a thickness of 4 μm or so from the polymer surface (8 μm or so in total of both sides), so that at least a thickness of 10 μm is necessary to obtain sufficient polarizing performance. The degree of penetration can be controlled by the concentration of the solution of iodine or a dichroic dyestuff, the temperature of the tub, and the time of immersion.

Thus, the greatest lower bound of the thickness of the binder is preferably 10 μm. The least upper bound of the thickness of the binder is preferably as thin as possible from the point of light leakage of a liquid crystal display. The least upper bound in the invention is preferably not higher than the thickness of commercially available products (about 30 μm), more preferably 25 μm or less, and still more preferably 20 μm or less. When the thickness is 20 μm or less, light leakage phenomenon comes to be not observed in a liquid crystal display of 17 inches.

Any of crosslinkable polymers and polymers that are crosslinked with a crosslinking agent can be used as the binder of a polarizer. As the examples of the polymers, the same polymers as described above as orientation films are exemplified.

Polyvinyl alcohols and modified polyvinyl alcohols are most preferred.

Modified polyvinyl alcohols are disclosed in JP-A-8-338913, JP-A-9-152509, and JP-A-9-316127.

Polyvinyl alcohols and modified polyvinyl alcohols may be used in combination of two or more kinds.

The binder of a polarizer may be crosslinked. Polymers polymerizable by themselves can be used as the crosslinked binder. A polarizing plate can be formed by the reaction between binders by light, heat or pH change of a polymer having a functional group or a binder capable of obtaining by the introduction of a functional group to a polymer.

A crosslinking structure may be introduced to a polymer with a crosslinking agent. Crosslinking is generally carried out by coating a coating solution containing a polymer, or a mixture of a polymer and a crosslinking agent, on a transparent support, and then heating the support. Since it is sufficient that the durability can be secured at the stage of the final product, crosslinking treatment may be performed at any stage until the final polarizing plate is obtained.

The addition amount of a crosslinking agent to a binder is preferably from 0.1 to 20 mass % based on the binder. By a crosslinking structure, the orientation property of a polarizing element and the humidity and heat resistance of a polarizer are improved.

A crosslinking film contains a certain degree of unreacted crosslinking agent even after termination of crosslinking reaction.

However, the residual amount of crosslinking agent is preferably 1.0 mass% or less in a polarizing plate, and more preferably 0.5 mass % or less. By lessening the residual amount of crosslinking agent, the reduction of polarizing degree does not occur after building the polarizer in a liquid crystal display, using for a long period of time, or even after allowing the liquid crystal display under high temperature and high humidity conditions for long.

With respect to crosslinking agents, U.S. Republished Patent 23,297 can be referred to. Boron compounds (e.g., boric acid and borax) can also be used as crosslinking agents.

As dichroic dyestuffs, azo dyestuffs, stilbene dyestuffs, pyrazolone dyestuffs, triphenylmethane dyestuffs, quinoline dyestuffs, oxazine dyestuffs, thiazine dyestuffs, and anthraquinone dyestuffs are used. Dichroic dyestuffs are preferably water-soluble. Dichroic dyestuffs preferably have a hydrophilic substituent (e.g., sulfo, amino, hydroxyl).

As the examples of dichroic dyestuffs, as the specific examples of dichroic dyes described in *Henko Film no Oyo* (*Application of Polarizer*), CMC Publishing Co., Ltd., and C.I. direct dyes in COLOUR INDEX, Third Edition, Volume 2, and *The Society of Dyers and Colourists*, published by The American Association of Textile Chemists and Colourists (1971) can be exemplified.

Optical Compensation Film:

The optical compensation film is generally used in a liquid crystal display, and means optical materials for compensating retardation, and has the same meaning as a retardation plate and an optical compensation sheet. An optical compensation sheet is provided with an optically anisotropic layer having a birefringence property, and is used for excluding coloring of the screen of a liquid crystal display, and for improving the characteristics of the angle of visibility.

An optically anisotropic layer may be formed of a composition containing a liquid crystal compound, or may be formed of a polymer film having birefringence. As the liquid crystal compounds, discotic liquid crystal compounds or rod-like liquid crystal compounds are preferred.

As rod-like liquid crystal molecules, azomethines, azoxies, cyanobiphenyls, cyanophenyl esters, benzoic esters, cyclohexanecarboxylic acid phenyl esters, cyanophenylcyclo-hexanes, cyano-substituted phenylpyrimidines, alkoxy-substituted phenylpyrimidines, phenyldioxanes, trans, and alkenylcyclohexylbenzonitriles are preferably used. It is preferred that these low molecular weight liquid crystal molecules have a polymerizable group in the molecule (e.g., JP-A-2000-304932, paragraph [0016]). Not only these low molecular weight liquid crystal molecules, high molecular weight liquid crystal molecules can also be used. The high molecular weight liquid crystal molecules are polymers having side chains corresponding to these low molecular weight liquid crystal molecules. As the optical compensation sheets using high molecular weight liquid crystal molecules, the compounds disclosed in JP-A-5-53016 are exemplified.

As the discotic liquid crystal molecules, compounds described in various literatures are exemplified (e.g., C. Destrade et al., *Mol. Crysr. Liq. Cryst.*, Vol. 71, p. 111 (1981); compiled by Nippon Kagaku-kai, *Kikan Kagaku Sosetsu (Quarterly, The Elements of Chemistry)*, No. 22, "Ekisho no Kagaku (Chemistry of Liquid Crystals)", Chapter 5, Chapter 10, Clause 2 (1994); B. Koline et al., *Angew. Chem. Soc. Chem. Comm.*, p. 1794 (1985); and J. Zhang et al., *J. Am. Chem. Soc.*, Vol. 116, p. 2655 (1994)). The polymerization of the discotic liquid crystal molecules is disclosed in JP-A-8-27284.

For fixing a discotic liquid crystal molecule by polymerization, it is necessary to bond a polymerizable group as the substituent to the disc-like core of the discotic liquid crystal molecule. It is preferred that the disc-like core and the polymerizable group are bonded via a linking group, by which the orientation condition can be maintained in polymerization reaction. For example, the compounds disclosed in JP-A-2000-155216, paragraphs [0151] to [0168] can be exemplified.

For optically compensating a liquid crystal cell in which a rod-like liquid crystal molecule is spirally oriented such as STN mode, it is preferred to orientate a discotic liquid crystal molecule also spirally.

By introducing an asymmetric carbon atom to the linking group, the discotic liquid crystal molecule can be spirally oriented. In addition, a discotic liquid crystal molecule can be spirally oriented by the addition of a compound containing an asymmetric carbon atom showing optical activity (a chiral agent) to an optically anisotropic layer.

Two or more discotic liquid crystal molecules may be used in combination. For example, polymerizable discotic liquid crystal molecules as described above can be used in combination with non-polymerizable discotic liquid crystal molecules.

The non-polymerizable discotic liquid crystal molecules are preferably compounds obtained by changing the polymerizable group in the above polymerizable discotic liquid crystal molecules to a hydrogen atom or an alkyl group. As the non-polymerizable discotic liquid crystal molecules, the compounds disclosed in, e.g., Japanese Patent 2640083 are exemplified.

When an optical compensation film is used as the protective film of a polarizer, it is preferred that the surface of the side of the optical compensation film to be stuck on the polarizer has been subjected to saponification treatment, preferably according to any of the above saponification treatments.

Adhesive:

A polarizer and the protective film for a polarizing plate can be stuck with an adhesive. As the adhesives, aqueous solutions containing polyvinyl alcohol resins (including polyvinyl alcohols modified by an acetoacetyl group, a sulfonic acid group, a carboxyl group, or an oxyalkylene group) and boron compounds can be used. The thickness of an adhesive layer is preferably from 0.01 to 10 μm after drying, and especially preferably from 0.05 to 5 μm. Transmittance:

For increasing the contrast ratio of a liquid crystal display, the transmittance of a polarizing plate is preferably high, and the degree of polarization is also preferably high. The transmittance of a polarizing plate is preferably in the range of from 30 to 50% to the light of the wavelength of 550 nm, more preferably from 35 to 50%, and most preferably from 40 to 50%. The degree of polarization is preferably in the range of from 90 to 100% to the light of the wavelength of 550 mn, more preferably from 95 to 100%, and most preferably from 99 to 100%.

(4) Image Display Device

An antireflection film in the invention can be applied to image display devices such as a liquid crystal display (LCD), a plasma display panel (PDP), an electroluminescence display (ELD), and a cathode ray tube (CRT). Since an antireflection film in the invention has a transparent support, it is used so that the transparent support side is in contact with the image screen of an image display device.

Of two polarizing plates sandwiching the liquid crystal cell of a liquid crystal display, a polarizing plate using an antireflection film of the invention can be used as the polarizing plate of an image screen side.

In this case, it is preferred to apply the polarizing plate of the invention to transmitting type, reflection type and semi-transmitting type liquid crystal displays of the modes of twisted nematic (TN), super twisted nematic (STN), vertical alignment (VA), in-plane switching (IPS), optically compensated Bend Cell (OCB), and electrically controlled birefringence (ECB).

VA mode liquid crystal cell includes (1) VA mode liquid crystal cell in a narrow sense of substantially perpendicularly orientating rod-like liquid crystal molecules when no voltage is applied, and substantially horizontally orientating when voltage is applied (e.g., JP-A-2-176625), (2) liquid crystal cell having multi-domains of VA mode (MVA mode) for widening angle of visibility (SID97, described in *Digest of Tech. Papers*, (drafts) 28, 845 (1997)), (3) liquid crystal cell of a mode of substantially perpendicularly orientating rod-like liquid crystal molecules when no voltage is applied, and twisted multi-domain orientating when voltage is applied (n-ASM mode) (described in the drafts of Liquid Crystal Forum, Japan, 58-59 (1998)), and (4) SURVAIVAL mode liquid crystal cell (released at LCD International 98).

OCB mode liquid crystal cell is a liquid crystal display using liquid crystal cell of bend orientation mode of orientating rod-like liquid crystal molecules substantially reverse directions (symmetrically) at the upper and lower of the liquid crystal cell, and disclosed in U.S. Pat. Nos. 4,583,825 and 5,410,422. Since rod-like liquid crystal molecules are orientated symmetrically at the upper and lower of the liquid crystal cell, the liquid crystal cell of bend orientation mode has a self-optical compensation function. Therefore, this liquid crystal mode is also called OCB (Optically Compensatory Bend) liquid crystal mode. The liquid crystal display of bend orientation mode has the advantage that response speed is quick.

In ECB mode liquid crystal cell, rod-like liquid crystal molecules are substantially horizontally orientated when voltage is not applied, and ECB mode liquid crystal cell is most widely used as color TFT liquid crystal display, and descriptions are seen in many literatures, for example, in *EL, PDP, LCD Displays*, published by Toray Research Center (2001).

As disclosed in JP-A-2001-100043, etc., by using, in particular in TN mode and OPS mode liquid crystal displays, an optically compensating film having the effect of widening angle of visibility on the side opposite to the side on which an anti-reflection film of the invention is used as one of two obverse and reverse protective films of a polarizer, a polarizing plate having a reflection-preventing effect and a widening effect of angle of visibility can be obtained by the thickness of one polarizing plate, so that very preferred.

When a polarizing plate using an antireflection film of the invention is used in transmitting type and semi-transmitting type liquid crystal displays, by using in combination with commercially available brightness-improving films (a polarization separating film having a polarization selecting layer, e.g., D-BEF manufactured by Sumitomo 3M Limited), display devices having higher visibility can be obtained.

Further, by combining with a λ/4 plate, an antireflection film in the invention can be used as a polarizing plate for a reflection type liquid crystal and a surface protective plate for an organic EL display to reduce reflected light on the surface and from the inside.

The invention will be described with reference to examples, but the invention is not limited thereto.

(1) Preparation of a Solution Containing (A) at least either a Hydrolyzed Product of Organosilane or a Condensation Reaction Product (Sol Solutions a to d):

Preparation of Sol Solution a (Concentration: 15.7%):

A reaction vessel having a capacity of 2,000 ml equipped with a thermometer, a nitrogen-introducing pipe and a dropping funnel was charged with 116 mass parts of dimethyldimethoxy-silane (KBM22, manufactured by Shin-Etsu Chemical Co., Ltd.), 600 mass parts of i-propaniol, and 3 mass parts of diisopropoxyaluminum ethylacetoacetate (Kerope EP-12, manufactured by Hope Chemical Co., Ltd.), and 20.0 mass parts of ion exchange water was slowly dropped thereto at room temperature while stirring. After conclusion of dropping, the reaction mixture was stirred at room temperature for 3 hours, followed by reaction at 60° C. for 4 hours, and then the reaction solution was cooled to room temperature, whereby sol solution a was obtained. As a result of GPC measurement, Mw of the obtained substance was 2,500.

Preparation of Sol Solution b (Concentration: 15.7%):

A reaction vessel having a capacity of 2,000 ml equipped with a thermometer, a nitrogen-introducing pipe and a dropping funnel was charged with 116 mass parts of dimethyldimethoxy-silane (KBM22, manufactured by Shin-Etsu Chemical Co., Ltd.), 600 mass parts of i-propanol, and 3 mass parts of diisopropoxyaluminum ethylacetoacetate (Kerope EP-12, manufactured by Hope Chemical Co., Ltd.), and 20.0 mass parts of ion exchange water was slowly dropped thereto at room temperature while stirring. After conclusion of dropping, the reaction mixture was stirred at room temperature for 3 hours, followed by reaction at 60° C. for 6 hours, and then the reaction solution was cooled to room temperature, whereby sol solution b was obtained. As a result of GPC measurement, Mw of the obtained substance was 6,000.

Preparation of Sol Solution c (Concentration: 15.4%):

A reaction vessel having a capacity of 2,000 ml equipped with a thermometer, a nitrogen-introducing pipe and a dropping funnel was charged with 116 mass parts of tetramethoxysilane (KBM04, manufactured by Shin-Etsu Chemical Co., Ltd.), 600 mass parts of i-propanol, 15 mass parts of acetylacetone, and 3 mass parts of diisopropoxyaluminum ethylacetoacetate (Kerope EP-12, manufactured by Hope Chemical Co., Ltd.), and 20.0 mass parts of ion exchange water was slowly dropped thereto at room temperature while stirring. After conclusion of dropping, the reaction mixture was stirred at room temperature for 3 hours, followed by reaction at 60° C. for 1 hour, and then the reaction solution was cooled to room temperature, whereby sol solution c was obtained. As a result of GPC measurement, Mw of the obtained substance was 1,200.

Preparation of Sol Solution d (Concentration: 15.4%):

A reaction vessel having a capacity of 2,000 ml equipped with a thermometer, a nitrogen-introducing pipe and a dropping funnel was charged with 116 mass parts of tetramethoxysilane (KBM04, manufactured by Shin-Etsu Chemical Co., Ltd.), 600 mass parts of i-propanol, 15 mass parts of acetylacetone, and 3 mass parts of diisopropoxyaluminum ethylacetoacetate (Kerope EP-12, manufactured by Hope Chemical Co., Ltd.), and 20.0 mass parts of ion exchange water was slowly dropped thereto at room temperature while stirring. After conclusion of dropping, the reaction mixture was stirred at room temperature for 3 hours, followed by reaction at 40° C. for 1 hour, and then the reaction solution was cooled to room temperature, whereby sol solution d was obtained. As a result of GPC measurement, Mw of the obtained substance was 250.

(2) Preparation of (B) a Solution Containing Fluorine-Containing Resin (Sol Solution e (Concentration: 7.9%)):

A reaction vessel having a capacity of 2,000 ml equipped with a thermometer, a nitrogen-introducing pipe and a dropping funnel was charged with 5.5 mass parts of $Si(OC_2H_5)_4$, 47.0 mass parts of $CF_3(CF_2)_5(CH_2)_2Si(OCH_3)_3$, and 600 mass parts of i-propanol, and 14.5 mass parts of 0.1 mol/liter of hydrochloric acid water was slowly dropped thereto at room temperature while stirring. After conclusion of dropping, the reaction mixture was stirred at room temperature for 3 hours, followed by reaction at 60° C. for 8 hours, and then the reaction solution was cooled to room temperature, whereby sol solution e was obtained. As a result of GPC measurement, Mw of the obtained substance was 8,800.

(3) Preparation of a Solution Containing (C) at least either a Hydrolyzed Product of a Silane Coupling Agent or a Condensation Reaction Product of the Hydrolyzed Product (Sol Solution f and g):

(Preparation of a Sol Solution f (Concentration: 10%))

A reaction vessel having a capacity of 2,000 ml equipped with a thermometer, a nitrogen-introducing pipe and a dropping funnel was charged with 100 mass parts of 3-acryloxypropyl-trimethoxysilane (KBM-5103, manufactured by Shin-Etsu Chemical Co., Ltd.), 800 mass parts of methyl ethyl ketone, and 3 mass parts of diisopropoxyaluminum ethylacetoacetate (Kerope EP-12, manufactured by Hope Chemical Co., Ltd.), and 20.0 mass parts of ion exchange water was slowly dropped thereto at room temperature while stirring. After conclusion of dropping, the reaction mixture was stirred at room temperature for 3 hours, followed by reaction at 60° C. for 3 hours, and then the reaction solution was cooled to room temperature, whereby sol solution f was obtained. As a result of GPC measurement, Mw of the obtained substance was 2,000.

(Preparation of a Sol Solution g)

A reaction vessel having a capacity of 1,000 ml equipped with a thermometer, a nitrogen-introducing pipe and a dropping funnel was charged with 187 g (0.80 mol) of acryloxypropyl-trimethoxysilane, 27.2 g (0.20 mol) of methyltrimethoxysilane, 320 g (10 mol) of methanol, and 0.06 g (0.001 mol) of KF, and 15.1 g (0.86 mol) of water was slowly dropped thereto at room temperature while stirring. After conclusion of dropping, the reaction mixture was stirred at room temperature for 3 hours, followed by stirring with heating for 2 hours under reflux of methanol. After that, the low boiling content was distilled off under reduced pressure, and the reaction solution was filtered, whereby 120 g of sol solution g was obtained. From GPC measurement, the mass average molecular weight of the thus-obtained material was 1,500, and of the oligomers or higher components, the components having a molecular weight of from 1,000 to 20,000 accounted for 30%.

From the result of measurement by $^1$H-NMR, the structure of the obtained material was a structure represented by the following formula.

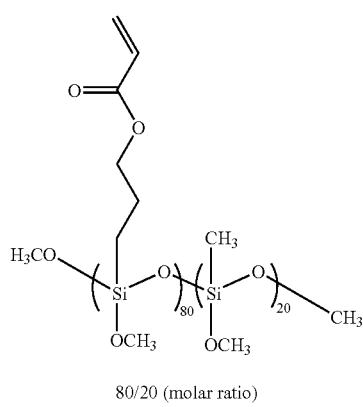

80/20 (molar ratio)

From the analysis by gas chromatography, the residual rate of acryloxypropyltrimethoxysilane of the starting material was 5% or less.

(4) Preparation of a Hard Coat Layer-Coating Solution:

Preparation of Hard Coat Layer-Coating Solution (HCL-1):

| | |
|---|---|
| PET-30 | 742 mass parts (weight parts) |
| Poly(glycidyl methacrylate) | 277 mass parts |
| Irgacure 184 | 51 mass parts |
| F-470 | 1.5 mass parts |
| KBM-5103 | 112 mass parts |
| MEK(methyl ethyl ketone) | 728 mass parts |
| Cyclohexanone | 503 mass parts |

Preparation of Hard Coat Layer-Coating Solution (HCL-2):

| | |
|---|---|
| PET-30 | 742 mass parts |
| Poly(glycidyl methacrylate) | 277 mass parts |
| Irgacure OXE01 | 51 mass parts |
| F-470 | 1.5 mass parts |
| KBM-403 | 112 mass parts |
| MEK(methyl ethyl ketone) | 728 mass parts |
| Cyclohexanone | 503 mass parts |

Preparation of Hard Coat Layer-Coating Solution (HCL-3):

| | |
|---|---|
| PET-30 | 742 mass parts |
| Poly(glycidyl methacrylate) | 277 mass parts |
| Irgacure 651 | 51 mass parts |
| F-470 | 1.5 mass parts |
| KBM-603 | 112 mass parts |
| MEK(methyl ethyl ketone) | 728 mass parts |
| Cyclohexanone | 503 mass parts |

Preparation of Hard Coat Layer-Coating Solution (HCL-4):

| | |
|---|---|
| PET-30 | 742 mass parts |
| Poly(glycidyl methacrylate) | 277 mass parts |
| Irgacure 184 | 51 mass parts |
| F-470 | 1.5 mass parts |
| Sol solution f | 800 mass parts |
| MEK(methyl ethyl ketone) | 28 mass parts |
| Cyclohexanone | 503 mass parts |

Preparation of Hard Coat Layer-Coating Solution (HCL-5):

| | |
|---|---|
| PET-30 | 742 mass parts |
| Poly(glycidyl methacrylate) | 277 mass parts |
| Irgacure 184 | 51 mass parts |
| F-476 | 1.5 mass parts |
| KBM-5103 | 112 mass parts |
| MEK(methyl ethyl ketone) | 728 mass parts |
| Cyclohexanone | 503 mass parts |

Preparation of Hard Coat Layer-Coating Solution (HCL-6):

| | |
|---|---|
| PET-30 | 742 mass parts |
| Poly(glycidyl methacrylate) | 277 mass parts |
| Irgacure 184 | 51 mass parts |
| P-1 | 1.5 mass parts |
| KBM-5103 | 112 massparts |
| MEK(methyl ethyl ketone) | 728 mass parts |
| Cyclohexanone | 503 mass parts |

Preparation of Hard coat Layer-Coating Solution (HCL-7):

| | |
|---|---|
| PET-30 | 854 mass parts |
| Poly(glycidyl methacrylate) | 277 mass parts |
| Irgacure 184 | 51 mass parts |
| F-470 | 1.5 mass parts |
| MEK(methyl ethyl ketone) | 728 mass parts |
| Cyclohexanone | 503 mass parts |

Preparation of Hard Coat Layer-Coating Solution (HCL-8):

| | |
|---|---|
| PET-30 | 742 mass parts |
| Poly(glycidyl methacrylate) | 277 mass parts |
| Irgacure 184 | 51 mass parts |
| KBM-5103 | 112 mass parts |
| MEK(methyl ethyl ketone) | 728 mass parts |
| Cyclohexanone | 503 mass parts |

Preparation of Hard Coat Layer-Coating Solution (HCL-9):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| F-476 | 0.10 mass parts |
| KBM-5103 | 10.0 mass parts |
| MEK(methyl ethyl ketone) | 11.5 mass parts |
| MIBK(methyl isobutyl ketone) | 27.0 mass parts |

Preparation of Antiglare Hard Coat Layer-Coating Solution (HCL-10):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| F-476 | 0.10 mass parts |
| KBM-5103 | 10.0 mass parts |
| Toluene | 38.5 mass parts |

Preparation of Antiglare Hard Coat Layer-Coating Solution (HCL-11):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| F-470 | 0.10 mass parts |
| KBM-403 | 10.0 mass parts |
| Toluene | 38.5 mass parts |

Preparation of Antiglare Hard Coat Layer-Coating Solution (HCL-12):

| | |
|---|---|
| PETA | 60.0 mass parts |
| Irgacure 184 | 2.0 mass parts |
| SX-350 (30%) | 1.7 mass parts |
| Crosslinked acryl-styrene particles (30%) | 13.3 mass parts |
| F-470 | 0.10 mass parts |
| Toluene | 38.5 mass parts |

Preparation of Antiglare Hard Coat Layer-Coating Solution (HCL-13):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| KBM-5103 | 10.0 mass parts |
| Toluene | 38.5 mass parts |

Preparation of Hard Coat Layer-Coating Solution (HCL-14):

| | |
|---|---|
| DeSolite Z7404 | 100 mass parts |
| DPHA | 31 mass parts |
| KBM-5103 | 10 mass parts |
| Methyl isobutyl ketone(MIBK) | 45 mass parts |

Preparation of Hard Coat Layer-Coating Solution (HCL-15):

| | |
|---|---|
| DeSolite Z7404 | 100 mass parts |
| DPHA | 20 mass parts |
| KBM-5103 | 8 mass parts |
| Irgacure 184 | 4 mass parts |
| KE-P150 | 7.5 mass parts |
| Methyl ethyl ketone(MEK) | 15 mass parts |
| Cyclohexanone | 10 mass parts |

Preparation of Hard Coat Layer-Coating Solution (HCL-16):

| | |
|---|---|
| PET-30 | 742 mass parts |
| Poly(glycidyl methacrylate) | 277 mass parts |
| Irgacure 184 | 51 mass parts |
| F-470 | 1.5 mass parts |
| KBM-5103 | 112 mass parts |
| MEK(methyl ethyl ketone) | 728 mass parts |
| Cyclohexanone | 503 mass parts |

Preparation of Antiglare Hard Coat Layer-Coating Solution (HCL-17):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| F-476 | 0.10 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-18):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| SH28PA | 0.02 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-19):

| | |
|---|---|
| PETA | 50.0 mass parts |
| Irgacure 184 | 2.0 mass parts |
| Agglomerated silica particles (30%) | 12.0 mass parts |
| F-476 | 0.10 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-20):

| | |
|---|---|
| PETA | 50.0 mass parts |
| Irgacure 184 | 2.0 mass parts |
| Agglomerated silica particles (30%) | 12.0 mass parts |
| SH28PA | 0.02 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-21):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| FZ-2191 | 0.02 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-22):

| | |
|---|---|
| PETA | 50.0 mass parts |
| Irgacure 184 | 2.0 mass parts |
| Agglomerated silica particles (30%) | 12.0 mass parts |
| FZ-2191 | 0.02 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-23):

| | |
|---|---|
| PETA | 50.0 mass parts |
| Irgacure 184 | 2.0 mass parts |
| SX-350 (30%) | 1.7 mass parts |
| Crosslinked acryl-styrene particles (30%) | 13.3 mass parts |
| TSF4460 | 0.05 mass parts |
| Sol solution g | 10.0 mass parts |
| Toluene | 28.5 mass parts |
| Cyclohexanone | 10.0 mass parts |

Preparation of Antiglare Hard Coat Layer-Coating Solution (HCL-24):

| | |
|---|---|
| PETA | 50.0 mass parts |
| Irgacure 184 | 2.0 mass parts |
| Agglomerated silica particles (30%) | 12.0 mass parts |
| FZ-3704 | 0.05 mass parts |
| Sol solution g | 10.0 mass parts |
| Toluene | 28.5 mass parts |
| Cyclohexanone | 10.0 mass parts |

The above components are as follows.

PET-30: Pentaerythritol triacrylate (manufactured by Nippon Kayaku Co., Ltd.)

PETA: Mixture of pentaerydiritol triaciylate and pentaeiydiritol tetraaciylate (manufactured by Nippon Kayaku Co., Ltd.)

Poly(glycidyl methacrylate): Mass average molecular weight: 15,000

Irgacures 184/651/OXEOI: Photo-polymerization initiators (manufactured by Ciba Specialty Chemicals Inc.)

KBM-5103/403/603: Silane coupling agents represented by formula (1) (manufactured by Shin-Etsu Chemical Co., Ltd.)

SX-350: Crosslinked polystyrene particles having an average particle size of 3.5 μm (refractive index: 1.60, a 30% toluene dispersion, used after dispersing for 20 minutes at 10,000 rpm with POLYTRON (manufactured by Soken Chemical & Engineering Co., Ltd.)

Crosslinked acryl-styrene particles: Average particle size: 3.5 μm, refractive index: 1.55, a 30% toluene dispersion (manufactured by Soken Chemical & Engineering Co., Ltd.)

P-1: Obtained by refining F-470 to make the molecular weight distribution (Mw/MN) 1.2

F-470/476: Fluorine-based surface modifiers (manufactured by Dainippon Ink and Chemicals Inc.)

DeSolite Z7404: Solution of zirconia fine particle-containing hard coat composition, solids content concentration: 60 mass %, zirconia fine particle content: 70 mass % to solids content, average particle size: 20 nm, composition of solvents: MIBK/MEK =9/1 (manufactured by JSR Corporation)

DeSolite Z7401: Solution of zirconia fine particle-containing hard coat composition, solids content concentration: 48 mass %, zirconia fine particle content: 70 mass % to solids content, average particle size: 20 mn, composition of solvents: cyclohexanone/MEK =5/5 (manufactured by JSR Corporation)

DPHA: Mixture of dipentaerythritol pentaacrylate and dipentaerythritol hexaacrylate (manufactured by Nippon Kayaku Co., Ltd.)

KE-P150: Silica particles having an average particle size of 1.5 μm, a 30% cyclohexanone dispersion, used after dispersing for 20 minutes at 10,000 rpm with POLYTRON (manufactured by Nippon Shokubai Co., Ltd.)

SH28PA/FZ-2191/FZ-3704: Silicone surface modifier (manufactured by Toray Dow Coming)

TSF4460: Silicone surface modifier (manufactured by GE Toshiba Silicone Co., Ltd.)

Agglomerated silica particles (30%): A secondary average particle size: 1.5 μn (refractive index: 1.48, a 30% toluene dispersion, dispersed with POLYTRON for 20 minutes at 10,000 rpm before use)

(5) Preparation of a Low Refractive Index Layer-Coating Solution:

The following components were put in a mixing tank and stirred, and then filtered through a polypropylene filter having a pore diameter of 0.4 μn, whereby low refractive index layer-coating solutions were prepared.

Preparation of Low Refractive Index Layer-Coating Solution (LL-1):

| Sol solution c | 15.9 mass parts |
| Sol solution e | 12.7 mass parts |
| Sol solution f | 8.0 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 30.0 mass parts |
| Butanol | 4.8 mass parts |

Preparation of Low Refractive Index Layer-Coating Solution (LL-2):

| Sol solution c | 13.7 mass parts |
| Sol solution e | 11.0 mass parts |
| Sol solution f | 7.0 mass parts |
| IPA-ST-L | 2.3 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 30.0 mass parts |
| Butanol | 4.8 mass parts |

Preparation of Low Refractive Index Layer-Coating Solution (LL-3):

| Sol solution c | 12.7 mass parts |
| Sol solution e | 11.0 mass parts |
| Sol solution f | 7.0 mass parts |
| Hollow silica fine particle sol | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 30.0 mass parts |
| Butanol | 4.8 mass parts |

Preparation of Low Refractive Index Layer-Coating Solution (LL-4):

| Sol solution c | 12.7 mass parts |
| Sol solution e | 11.0 mass parts |
| KBM-5103 | 0.7 mass parts |
| Hollow silica fine particle sol | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-5):

| Sol solution c | 12.7 mass parts |
| Sol solution e | 11.0 mass parts |
| KBM-403 | 0.7 mass parts |
| Hollow silica fine particle sol | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-6):

| Sol solution c | 12.7 mass parts |
| Sol solution e | 11.0 mass parts |
| KBM-603 | 0.7 mass parts |
| IPA-ST-L | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-7):

| Sol solution a | 12.7 mass parts |
| Sol solution e | 11.0 mass parts |
| KBM-5103 | 0.7 mass parts |
| Hollow silica fine particle sol | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-8):

| Sol solution b | 12.7 mass parts |
| Sol solution e | 11.0 mass parts |
| KBM-5103 | 0.7 mass parts |
| Hollow silica fine particle sol | 4.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-9):

| | |
|---|---|
| Sol solution d | 15.9 mass parts |
| Sol solution e | 12.7 mass parts |
| Sol solution f | 8.0 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 30.0 mass parts |
| Butanol | 4.8 mass parts |

Preparation of Low Refractive Index Layer-Coating Solution (LL-10):

| | |
|---|---|
| Sol solution c | 8.8 mass parts |
| Sol solution e | 30.0 mass parts |
| Sol solution f | 1.0 mass parts |
| Cymel 303 | 0.3 mass parts |
| p-Toluenesulfonic acid | 0.03 mass parts |
| i-Propanol | 19.0 mass parts |
| MEK(methyl ethyl ketone) | 36.8 mass parts |
| Butanol | 4.8 mass parts |

Preparation of Low Refractive Index Layer-Coating Solution (LL-11):

| | |
|---|---|
| Sol solution c | 17.2 mass parts |
| Sol solution e | 3.8 mass parts |
| Sol solution f | 1.0 mass parts |
| IPA-ST-L | 2.3 mass parts |
| Cymel 303 | 0.02 mass parts |
| p-Toluenesulfonic acid | 0.01 mass parts |
| i-Propanol | 36.2 mass parts |
| MEK(methyl ethyl ketone) | 36.0 mass parts |
| Butanol | 4.8 mass parts |

Preparation of Low Refractive Index Layer-Coating Solution (LL-12):

| | |
|---|---|
| Sol solution c | 13.7 mass parts |
| Sol solution e | 11.0 mass parts |
| KBM-503 | 0.7 mass parts |
| Hollow silica fine particle sol | 2.3 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 36.0 mass parts |
| Butanol | 4.8 mass parts |

Preparation of Low Refractive Index Layer-Coating Solution (LL-13):

| | |
|---|---|
| Sol solution c | 18.1 mass parts |
| Sol solution e | 14.6 mass parts |
| Cymel 303 | 0.1 mass parts |
| p-Toluenesulfonic acid | 0.03 mass parts |
| i-Propanol | 36.0 mass parts |
| MEK(methyl ethyl ketone) | 30.0 mass parts |
| Butanol | 4.8 mass parts |

Preparation of Low Refractive Index Layer-Coating Solution (LL-14):

| | |
|---|---|
| Colcoat N103 (2%) | 245 mass parts |
| Opstar JTA105 (5%) | 100 mass parts |
| Opstar JTA105A (5%) | 1 mass part |
| IPA-ST-L | 23 mass parts |
| Sol solution f | 15 mass parts |
| Butyl acetate | 365 mass parts |

Preparation of Low Refractive Index Layer-Coating Solution (LL-15):

| | |
|---|---|
| Colcoat N103 (2%) | 245 mass parts |
| Opstar JTA105 (5%) | 100 mass parts |
| Opstar JTA105A (5%) | 1 mass part |
| Hollow silica fine particle sol | 23 mass parts |
| Sol solution f | 15 mass parts |
| Butyl acetate | 365 mass parts |

Preparation of Low Refractive Index Layer-Coating Solution (LL-16):

| | |
|---|---|
| Sol solution c | 15.9 mass parts |
| Sol solution e | 12.7 mass parts |
| Sol solution f | 8.0 mass parts |
| Cymel 303 | 0.1 mass parts |
| Salt of p-toluenesulfonic acid and 4-methylmorpholine | 0.05 mass parts |
| i-Propanol | 36.0 mass parts |
| MEK(methyl ethyl ketone) | 30.0 mass parts |
| Butanol | 4.8 mass parts |

IPA-ST-L: Colloidal silica dispersion (average particle size 45 nm, concentration of solids content: 30%, manufactured by Nissan Chemical Industries, Ltd.)

Hollow silica fine particle sol: Particle size: about 40 to 50 nm, shell thickness: 6 to 8 nm, refractive index: 1.31, concentration of solids content: 20%, main solvent: isopropyl alcohol, manufactured according to Preparation Example 4 in JP-A-2002-79616 by changing a particle size)

Cymel 303: Methoxylated methylmelamine (manufactured by Mitsui Cytec)

KBM-5103/403/603/503: Silane coupling agents represented by formula (1) (manufactured by Shin-Etsu Chemical Co., Ltd.)

Colcoat N103: Organosiloxane oligomer (mass average molecular weight: 950, manufactured by Colcoat), which corresponds to the component (A) of the present invention.

Opstar JTA105: Fluorine compound (containing polyethylene glycol, hexamethylolmelamine, and acid generator, manufactured by JSR Corporation) (mass average molecular weight: 10,000 to 30,000), which corresponds to the component (B) of the present invention.

Opstar JTA105A: Hardening agent (manufactured by JSR Corporation)

(6) Preparation of Antistatic Layer Coating Solution (AS-1):
To 100 g of ATO dispersed hard coat agent (Pertron C-4456-S7 (solid content 45%/o), manufactured by Nippon Penmox) were added 30 g of cyclohexanone, 10 g of methyl ethyl ketone, and 1.5 g of a silane coupling agent KBM-5103 (3-acryloxy-propyltrimethoxysilanie, manufactured by Shin- Etsu Chemical Co., Ltd.), and the reaction mixture was stirred. After stirring, the reaction solution was filtered through a polypropylene filter having a pore diameter of 10 µm, whereby antistatic layer coating solution (AS-1) was prepared.

EXAMPLE 1

Manufacture of Antireflection Film:

The above-prepared hard coat Layer-Coating Solution (HCL-1) and low refractive index layer-Coating Solution (LL-1) were coated and dried according to the following methods. Hard coat layer-Coating Solution (HCL-1) was coated on a triacetyl cellulose film (TD80UF, refractive index: 1.48, manufactured by Fuji Photo Film Co., Ltd.) having a thickness of 80 µm by means of a gravure coater at a transporting rate of 20 m/min. The coated layer was dried in a first drying zone at 30° C. for 30 seconds, then in a second drying zone at 110° C. for 2 minutes. After drying, the coated layer was cured under nitrogen purge in oxygen concentration of 0.1% or less with an air-cooled metal halide lamp of 240 W/cm (manufactured by EYEGRAPHICS, CO., LTD.) by irradiation with ultraviolet ray at illumination intensity of 400 mW/cm2 and irradiation dose of 300 mJ/cm$^2$, and the film was wound. The maximum air speed in the first drying zone was 0.2 m/s, and the coated layer was confirmed to be setting in the drying zone. The hard coat layer had a refractive index of 1.51 and a thickness of 7 µm.

Subsequently, low refractive index layer coating solution (LL-1) was coated by means of a gravure coater at a transporting rate of 20 m/min. The coated layer was dried in a first drying zone at 25° C. for 30 seconds, 90° C. for 2 minutes, and then 140° C. for 5 minutes by heating. After drying, the coated layer was cured under nitrogen purge in oxygen concentration of 0.1 vol % or less with an air-cooled metal halide lamp of 240 W/cm (manufactured by EYEGRAPHICS, CO., LTD.) by irradiation with ultraviolet ray at illumination intensity of 600 mW/cm$^2$ and irradiation dose of 400 mJ/cm$^2$, whereby a low refractive index layer (refractive index: 1.43, thickness: 86 nm) was prepared. Thus, antireflection film (AF-1) was manufactured.

Antireflection films (AF-2) to (AF-24), (AF-5 1) to (AF-60) were manufactured with each coating solution shown in Table 1 below in the same manner as in the manufacture of (AF-1). In (AF-2), (AF-6), (AF-14), (AF-19), (AF-23), (AF-53) and (AF-54), an antistatic layer was provided between a support and a hard coat layer. The thickness of the antistatic layer was 100 nm. The thickness of the hard coat layer in (AF-53), (AF-54), (AF-56) and (AF-58) was made 2.5 µm. In (AF-59), before coating the low refractive index layer coating solution, corona discharge treatment was performed on the hard coat layer on the conditions of 2.0 kW and line speed of 12 n/min.

However, the low refractive index layer coating solution (LL-9) used in (AF-25) was gradually increased in viscosity after preparation of the solution and finally gelled, so that coating could not be performed.

Further, the low refractive index layer coating solution (LL-16) used in (AF-60) was more excellent in aging stability than other low refractive index layer coating solutions.

TABLE 1

| Sample No. | | Antistatic Layer | Hard Coat Layer | Low Refractive Index Layer |
|---|---|---|---|---|
| Invention | AF-1 | — | HCL-1 | LL-1 |
| Invention | AF-2 | AS-1 | HCL-1 | LL-2 |
| Invention | AF-3 | — | HCL-1 | LL-3 |
| Invention | AF-4 | — | HCL-1 | LL-4 |
| Invention | AF-5 | — | HCL-1 | LL-7 |
| Invention | AF-6 | AS-1 | HCL-1 | LL-8 |
| Invention | AF-7 | — | HCL-1 | LL-10 |
| Invention | AF-8 | — | HCL-1 | LL-11 |
| Invention | AF-9 | — | HCL-2 | LL-5 |
| Invention | AF-10 | — | HCL-3 | LL-6 |
| Invention | AF-11 | — | HCL-4 | LL-3 |
| Invention | AF-12 | — | HCL-5 | LL-3 |
| Invention | AF-13 | — | HCL-6 | LL-3 |
| Invention | AF-14 | AS-1 | HCL-7 | LL-3 |
| Comparison | AF-15 | — | HCL-7 | LL-13 |
| Invention | AF-16 | — | HCL-8 | LL-3 |
| Invention | AF-17 | — | HCL-9 | LL-3 |
| Invention | AF-18 | — | HCL-10 | LL-3 |
| Invention | AF-19 | AS-1 | HCL-11 | LL-5 |
| Comparison | AF-20 | — | HCL-12 | LL-13 |
| Invention | AF-21 | — | HCL-13 | LL-3 |
| Invention | AF-22 | — | HCL-14 | LL-3 |
| Invention | AF-23 | AS-1 | HCL-15 | LL-3 |
| Invention | AF-24 | — | HCL-16 | LL-12 |
| Comparison | AF-25 | — | HCL-1 | LL-9 |

TABLE 2

| Sample No. | | Antistatic Layer | Hard Coat Layer | Low Refractive Index Layer |
|---|---|---|---|---|
| Invention | AF-51 | — | HCL-17 | LL-2 |
| Invention | AF-52 | — | HCL-18 | LL-3 |
| Invention | AF-53 | AS-1 | HCL-19 | LL-2 |
| Invention | AF-54 | AS-1 | HCL-20 | LL-3 |
| Invention | AF-55 | — | HCL-21 | LL-2 |
| Invention | AF-56 | — | HCL-22 | LL-3 |
| Invention | AF-57 | — | HCL-23 | LL-14 |
| Invention | AF-58 | — | HCL-24 | LL-15 |
| Invention | AF-59 | — | HCL-1 | LL-1 |
| Invention | AF-60 | — | HCL-1 | LL-16 |

Evaluation of Antireflection Film (AFD:

The above-obtained film samples were evaluated for the following items.

(1) Specular Reflectance

An adaptor ARV-474 was attached to a spectrophotometer V-550 (manufactured by JASCO CORPORATION), and the specular reflectance of the outgoing angle −5° at the incident angle 5° of each antireflection film sample was measured in the wavelength region of from 380 to 780 nm. The average reflectance in the region of from 450 to 650 nm was computed, and the antireflection property of each sample was evaluated.

(2) Evaluation of Scratch Resistance with Steel Wool

A rubbing test of the surface of each antireflection film sample was performed with a rubbing tester on the following conditions.

Environmental condition for evaluation: 25° C., 60% RH

Rubbing material: Steel wool (Grade No. 0000, manufactured by Nippon Steel Wool Co., Ltd.) was wound around the rubbing tip (1 cm×1 cm) of the tester touching the sample, and set with a band to hold it in position.

Traveling distance (one way): 13 cm

Rubbing rate: 13 cm/sec.

Load: 500 g/cm$^2$

Contact area of rubbing tip: 1 cm×1 cm

Number of times of rubbing: 10 times of going and returning

The reverse of a sample that finished rubbing was painted with oil black ink and the rubbed part was visually observed with reflected light. The scratch on the rubbed part was evaluated according to the following criteria.

⊚: A scratch is not seen at all even with very careful observation.

○: A faint scratch is vaguely seen with very careful observation.

○△: A faint scratch is seen.

△: A moderate scratch is seen.

△×: There is a scratch recognizable at a glance.

(3) Wiping Off Property of Fingerprint

A finger was pressed on the surface of the side having a low refractive index layer of each antireflection film sample to leave a fingerprint, and the fingerprint was wiped with a cellulose nonwoven fabric "BEMCOT M-3" (manufactured by Asahi Kasei Corporation), and easiness of coming off was evaluated according to the following three grades.

○: Capable of wiping off cleanly with three times of going and returning.

△: Capable of wiping off cleanly with ten times of going and returning.

×: Leftover is seen even after ten times of going and returning.

(4) Evaluation of Antifouling Property

A mark painted on the surface of the side having a low refractive index layer of each antireflection film sample with oil ink Mckee Care (manufactured by ZEBRA CO., LTD.) was wiped with a cellulose nonwoven fabric "BEMCOT M-3" (manufactured by Asahi Kasei Corporation), and easiness of coming off was evaluated according to the following two grades.

○: The oil ink can be completely wiped off.

×: Traces of wiping of the oil ink are left behind.

(5) Evaluation of Antifouling Durability

The above evaluation of antifouling property was repeated at the same place, and the number of times of leaving the traces of wiping was evaluated according to the following three grades.

○: Capable of wiping six times or more in total.

△: Capable of wiping two to five times in total.

×: Capable of wiping only one time.

(6) Evaluation of Dust Adhesion

The transparent support side of each antireflection film sample was stuck on CRT surface, and the device was used in a room having from 1,000,000 to 2,000,000/ft$^3$ of dusts and fuzz of tissue paper for 24 hours. The number of dusts and fuzz of tissue paper adhered per 100 cm2 of the antireflection film was measured and evaluated as follows. A case where the average value of respective results was less than 20 was graded A, from 20 to 49 was graded B, from 50 to 199 was graded C, and 200 or more was graded D.

(7) Evaluation of Tint Unevenness

The reverse of each sample was painted with oil black ink, and tint unevenness was visually observed in a dark room with the reflected light of "National Palook three wavelength type white fluorescent lamp (F.L 15EX-N 15W)". Tint unevenness was evaluated according to the following criteria.

⊚: Almost negligible.

○: Tint unevenness is slightly seen but negligible.

△: A little irritating.

×: Considerably irritating.

(8) Evaluation of Surface Segregation Degrees of Silicon (Si Atom) and Fluoroalkyl (F Atom)

The photoelectron spectral intensity ratio Si2p/C1s (=Si(a)) of Si2P, C1s of the outermost surface of an antireflection film measured with ESCA-3400 (manufactured by Shimadzu Corporation) (vacuum degree: 1×10$^5$ Pa, X-ray source, target: Mg, voltage: 12 kV, electric current: 20 mA) is found, further, the photoelectron spectral intensity ratio Si2p/C1s (=Si(b)) of Si2P, C1s of the 80% lower layer from the surface, which is etched until the thickness of the low refractive index layer reaches ⅕ (±5%), measured with ion etching gun of the attachment of ESCA-3400 (ion gun, voltage: 2 kV, electric current: 20 mA) is found. The variations of respective intensity ratios Si(a)/Si(b) before and after etching are found from these values, and the variation of Si2p/C1s ratio before and after etching (the photoelectron spectral intensity ratio at the outermost surface of the low refractive index layer/the photoelectron spectral intensity ratio in the vicinity of the surface to the 80% lower layer of the low refractive index layer) was evaluated according to the following three grades.

The above measurement was performed at three places at intervals of at least 2 cm or more from each other on the same film surface.

⊚: The intensity ratio after etching is 2 times or more.

○: The intensity ratio after etching is 1.5 times or more and less than 2 times.

△: The intensity ratio after etching is less than 1.5 times.

With respect to C 1s, the intensity was found at the position of peak of each photoelectron spectrum, and with respect to Si2p, the intensity at the position of peak coming from the Si atom of silicone (polydimethylsiloxane) having bonding energy in the vicinity of 105 eV was used in the computation of the intensity ratio to distinguish it from the Si atom coming from inorganic silica particles. Prior to measurement, a preliminary experiment of gradually etching the surface of a low refractive index layer was carried out beforehand on various etching conditions, and the conditions getting from the surface to the depth of 80% were found based on the etching conditions required to reach the lower hard coat layer.

(9) Surface Haze

The whole haze (H), the inside haze as (Hi), and the surface haze as (Hs) of the obtained films were measured by the following measurements.

(a) The whole haze value (H) of an obtained film was measured according to JIS-K7136.

(b) A few drops of silicone oil were dropped on the obverse of the low refractive index layer side of the obtained film and the reverse, the film was sandwiched between two glass plates (micro-slide glass, No. S 9111, manufactured by MATSUNAMI) having a thickness of 1 mm to completely optically stick two glass plates and the obtained film, and haze was measured in a state of excluding surface haze. Separately, silicone oil alone was inserted between two glass plates and haze was measured, and a computed value by subtracting this haze value from the above haze was taken as inside haze (Hi).

(c) A value obtained by subtracting the inside haze (Hi) computed in the above (b) from the whole haze value (H) measured in the above (a) was computed as the surface haze value (Hs).

(10) 60° Glossiness

60° Glossiness was measured according to JIS-Z8741 with a gloss meter GM-26PRO/Auto (manufactured by MURAKAMI COLOR RESEARCH LABORATORY).

(11) Measurement of log SR (Surface resistance)

Surface resistance value (SR) was measured by a circular electrode method after the sample was subjected to humidity conditioning at 25° C., 60% RH for 2 hours. logSR was computed as the common logarithm of SR.

(12) Critical Load in Rubbing with Cotton Swab after Exposure to Ozone

Each sample was processed to a polarizing plate (the process to a polarizing plate was performed in the same manner as in Example 3), and after preservation of the polarizing plate in an atmosphere of ozone of 10 ppm, 30° C., 60% RH for 192 hours (8 days), the polarizing plate was taken out into the air. A cotton swab (Health Refle, a trade name, manufactured by TOYOEIZAI CORPORATION) was fixed at the tip of a rubbing part, the top and bottom of the sample were fixed with clips in a plain tray, the sample and the cotton swab were immersed in water at 25° C., and rubbing test of going and returning was performed 20 times with the cotton swab being applied with a load. A rubbing distance (one way) was 1 cm and a rubbing speed was about two goings and comings/second. The water on the surface of the sample was dried after the rubbing test, and whether the film was peeled or not was visually observed. The same sample was tested ten times repeatedly, and until film peeling occurred five times or more, the initial load of 100 g was increased by 50 g at a time. The load by which film peeling occurred less than five times in ten times of tests was defined as a critical load. Film peeling was visually judged depending upon whether the reflection state of the surface was changed or not. The greater the critical load, the more excellent is the scratch resistance.

The results of evaluations are shown in Table 3 and 4 below.

TABLE 3

| | Sample No. | Specular Reflectance | Scratch Resistance | Fingerprint Wiping Property | Antifouling Property | Antifouling Durability | Dust Adhesion | Tint Unevenness | Fluorine Content (%) | Si/C | Surface Haze | 60° Glossiness | logSR | Ozone Resistance |
|---|---|---|---|---|---|---|---|---|---|---|---|---|---|---|
| Inv. | AF-1 | 1.6 | ○ | ○ | ○ | ○ | B | ○ | 21 | ◎ | 0.1 | 83 | 13.5 | 550 |
| Inv. | AF-2 | 1.6 | ◎ | ○ | ○ | ○ | B | ○ | 16 | ◎ | 0.1 | 81 | 10.6 | 750 |
| Inv. | AF-3 | 1.4 | ◎ | ○ | ○ | ○ | B | ○ | 14 | ◎ | 0.1 | 79 | 13.5 | 750 |
| Inv. | AF-4 | 1.4 | ◎ | ○ | ○ | ○ | B | ○ | 14 | ◎ | 0.2 | 84 | 13.6 | 700 |
| Inv. | AF-5 | 1.3 | ◎ | ○ | ○ | Δ | B | ○ | 14 | ◎ | 0.1 | 82 | 13.5 | 700 |
| Inv. | AF-6 | 1.4 | ◎ | ○ | ○ | Δ | B | ○ | 15 | ◎ | 0.1 | 82 | 10.5 | 700 |
| Inv. | AF-7 | 1.6 | ○ | Δ | ○ | ○ | C | ○ | 35 | ○ | 0.2 | 81 | 13.5 | 750 |
| Inv. | AF-8 | 1.6 | ○ | ○ | ○ | Δ | B | ○ | 8 | ○ | 0.2 | 83 | 13.6 | 750 |
| Inv. | AF-9 | 1.4 | ◎ | ○ | ○ | ○ | B | ○ | 14 | ◎ | 0.1 | 82 | 13.5 | 650 |
| Inv. | AF-10 | 1.6 | ◎ | ○ | ○ | ○ | B | ○ | 14 | ◎ | 0.1 | 82 | 13.6 | 650 |
| Inv. | AF-11 | 1.4 | ◎ | ○ | ○ | ○ | B | ○ | 14 | ◎ | 0.2 | 81 | 13.4 | 750 |
| Inv. | AF-12 | 1.4 | ◎ | ○ | ○ | ○ | B | ○ | 14 | ◎ | 0.1 | 84 | 13.4 | 750 |
| Inv. | AF-13 | 1.4 | ◎ | ○ | ○ | ○ | B | ◎ | 14 | ◎ | 0.1 | 81 | 13.6 | 750 |
| Inv. | AF-14 | 1.3 | ○ | ○ | ○ | ○ | B | X | 14 | ◎ | 0.2 | 80 | 10.5 | 550 |
| Comp. | AF-15 | 1.6 | ΔX | ○ | ○ | ○ | B | X | 19 | ◎ | 0.1 | 83 | 13.5 | 300 |
| Inv. | AF-16 | 1.4 | ◎ | ○ | ○ | ○ | B | ○ | 14 | ◎ | 0.1 | 82 | 13.5 | 750 |
| Inv. | AF-17 | 1.3 | ◎ | ○ | ○ | ○ | B | ○ | 14 | ◎ | 0.3 | 70 | 13.5 | 750 |
| Inv. | AF-18 | 1.5 | ◎ | ○ | ○ | ○ | B | ○ | 14 | ◎ | 5.2 | 48 | 13.5 | 750 |
| Inv. | AF-19 | 1.4 | ◎ | ○ | ○ | ○ | B | ○ | 14 | ◎ | 4.8 | 45 | 10.4 | 700 |
| Comp. | AF-20 | 1.8 | ΔX | ○ | ○ | ○ | B | ○ | 19 | ◎ | 5.1 | 47 | 13.4 | 300 |
| Inv. | AF-21 | 1.4 | ◎ | ○ | ○ | ○ | B | Δ | 14 | ◎ | 4.9 | 45 | 13.6 | 750 |
| Inv. | AF-22 | 1.4 | ◎ | ○ | ○ | ○ | B | ○ | 14 | ◎ | 0.2 | 78 | 13.5 | 750 |
| Inv. | AF-23 | 1.4 | ◎ | ○ | ○ | ○ | B | ○ | 14 | ◎ | 0.3 | 72 | 10.5 | 750 |
| Inv. | AF-24 | 1.4 | ◎ | ○ | ○ | ○ | B | ○ | 18 | ◎ | 0.1 | 80 | 13.5 | 700 |
| Comp. | AF-25 | A low refractive index layer was not coated. | | | | | | | | | | | | |

TABLE 4

| | Sample No. | Specular Reflectance | Scratch Resistance | Fingerprint Wiping Property | Antifouling Property | Antifouling Durability | Dust Adhesion | Tint Unevenness | Fluorine Content (%) | Si/C | Surface Haze | 60° Glossiness | logSR | Ozone Resistance |
|---|---|---|---|---|---|---|---|---|---|---|---|---|---|---|
| Inv. | AF-51 | 1.6 | ◎ | ○ | ○ | ○ | B | ○ | 16 | ◎ | 5.2 | 48 | 13.5 | 750 |
| Inv. | AF-52 | 1.5 | ◎ | ○ | ○ | ○ | B | ○ | 14 | ◎ | 5.0 | 49 | 13.6 | 750 |
| Inv. | AF-53 | 1.6 | ◎ | ○ | ○ | ○ | B | ○ | 16 | ◎ | 4.9 | 51 | 10.5 | 750 |
| Inv. | AF-54 | 1.4 | ◎ | ○ | ○ | ○ | B | ○ | 14 | ◎ | 5.1 | 49 | 10.6 | 750 |
| Inv. | AF-55 | 1.6 | ◎ | ○ | ○ | ○ | B | ○ | 16 | ◎ | 5.0 | 50 | 13.5 | 750 |
| Inv. | AF-56 | 1.5 | ◎ | ○ | ○ | ○ | B | ○ | 14 | ◎ | 5.0 | 49 | 13.5 | 750 |
| Inv. | AF-57 | 1.6 | ◎ | ○ | ○ | ○ | B | ○ | 18 | ◎ | 5.3 | 47 | 13.6 | 750 |
| Inv. | AF-58 | 1.4 | ◎ | ○ | ○ | ○ | B | ○ | 18 | ◎ | 5.2 | 48 | 13.5 | 750 |
| Inv. | AF-59 | 1.6 | ◎ | ○ | ○ | ○ | B | ○ | 21 | ◎ | 0.1 | 83 | 13.6 | 650 |
| Inv. | AF-60 | 1.6 | ○ | ○ | ○ | ○ | B | ○ | 21 | ◎ | 0.1 | 81 | 13.5 | 550 |

As can be seen from the results in Tables 3 and 4, comparative examples (AF-15) and (AF-20) are inferior in scratch resistance. (AF-7) was inferior in a wiping off property of fingerprint and dust adhesion.

EXAMPLE 2

Manufacture of Antireflection Film:

The surface of coating side of a triacetyl cellulose film having a thickness of 80 μm (TD-80UF, manufactured by Fuji Photo Film Co., Ltd.) was subjected to destaticizing treatment with an ultrasonic dust catcher, and the hard coat Layer-Coating Solution (HCL-1) was coated with die coater 10 shown in FIG. 1 at a coating speed of 30 m/min and a coating amount of 17.5 ml/m². The degree of pressure reduction in the pressure reducing chamber was 0.5 kPa. In coating HCL-1, gap GL between downstream side lip land 18b and web 12 was made 100 μM. The coated web was then dried at $_{80}$° C., and the coated layer was cured under nitrogen purge in oxygen concentration of 0.1 vol % or less with an air-cooled metal halide lamp of 160 W/cm (manufactured by EYE-GRAPFHICS, CO., LTD.) by irradiation with ultraviolet ray at illumination intensity of 400 mW/cm² and irradiation dose of 500 mJ/cm², and the film was wound, whereby a hard coat layer having a refractive index of 1.51 and a thickness of 7 μm was formed.

Low refractive index layer coating solution (LL-1) was coated on the above hard coat layer with the above die coater at a coating speed of 30 m/min and a coating amount of 5.5 ml/m². The degree of pressure reduction in the pressure reducing chamber was 0.55 kPa. The coated web was then dried at 25° C. for 30 seconds, 90° C. for 2 minutes, and then 140° C. for 5 minutes by heating. After drying, the coated layer was cured under nitrogen purge in oxygen concentration of 0.1 vol % or less with an air-cooled metal halide lamp of 240 W/cm (manufactured by EYEGRAPHICS, CO., LTD.) by irradiation with ultraviolet ray at illumination intensity of 600 mW/cm² and irradiation dose of 400 mJ/cm², whereby a low refractive index layer (refractive index: 1.43, thickness: 83 μnm) was prepared. Antireflection film (AF-26) was thus manufactured.

Further, antireflection films (AF-27) to (AF-49), (AF-61) to (AF-70) were prepared with each coating solution shown in Tables 5 and 6 below in the same manner as in the manufacture of (AF-26). In (AF-27), (AF-3 1), (AF-39), (AF-44), (AF-48), (AF-63) and (AF-64), the thickness of the antistatic layer was adjusted to 100 nm. The thickness of the hard coat layer in (AF-63), (AF-64), (AF-66) and (AF-67) was made 2.5 μm.

In (AF-69), before coating the low refractive index layer coating solution, corona discharge treatment was performed on the hard coat layer on the conditions of 2.0 kW and line speed of 12 m/min.

However, the low refractive index layer coating solution (LL-9) used in (AF-50) was gradually increased in viscosity after preparation of the solution and finally gelled, so that coating could not be performed.

Further, the low refractive index layer coating solution (LL-16) used in (AF-70) was more excellent in aging stability than other low refractive index layer coating solutions.

TABLE 5

| | Sample No. | Antistatic Layer | Hard Coat Layer | Low Refractive Index Layer |
|---|---|---|---|---|
| Invention | AF-27 | AS-1 | HCL-1 | LL-2 |
| Invention | AF-28 | — | HCL-1 | LL-3 |
| Invention | AF-29 | — | HCL-1 | LL-4 |
| Invention | AF-30 | — | HCL-1 | LL-7 |
| Invention | AF-31 | AS-1 | HCL-1 | LL-8 |
| Invention | AF-32 | — | HCL-1 | LL-20 |
| Invention | AF-33 | — | HCL-1 | LL-11 |
| Invention | AF-34 | — | HCL-2 | LL-5 |
| Invention | AF-35 | — | HCL-3 | LL-6 |
| Invention | AF-36 | — | HCL-4 | LL-3 |
| Invention | AF-37 | — | HCL-5 | LL-3 |
| Invention | AF-38 | — | HCL-6 | LL-3 |
| Invention | AF-39 | AS-1 | HCL-7 | LL-3 |

TABLE 5-continued

| | Sample No. | Antistatic Layer | Hard Coat Layer | Low Refractive Index Layer |
|---|---|---|---|---|
| Comparison | AF-40 | — | HCL-7 | LL-13 |
| Invention | AF-41 | — | HCL-8 | LL-3 |
| Invention | AF-42 | — | HCL-9 | LL-3 |
| Invention | AF-43 | — | HCL-10 | LL-5 |
| Invention | AF-44 | AS-1 | HCL-11 | LL-5 |
| Comparison | AF-45 | — | HCL-12 | LL-13 |
| Invention | AF-46 | — | HCL-13 | LL-3 |
| Invention | AF-47 | — | HCL-14 | LL-3 |
| Invention | AF-48 | AS-1 | HCL-15 | LL-3 |
| Invention | AF-49 | — | HCL-16 | LL-12 |
| Comparison | AF-50 | — | HCL-1 | LL-9 |

TABLE 6

| | Sample No. | Antistatic Layer | Hard Coat Layer | Low Refractive Index Layer |
|---|---|---|---|---|
| Invention | AF-61 | — | HCL-17 | LL-2 |
| Invention | AF-62 | — | HCL-18 | LL-3 |
| Invention | AF-63 | AS-1 | HCL-19 | LL-2 |
| Invention | AF-64 | AS-1 | HCL-20 | LL-3 |
| Invention | AF-65 | — | HCL-21 | LL-2 |
| Invention | AF-66 | — | HCL-22 | LL-3 |
| Invention | AF-67 | — | HCL-23 | LL-14 |
| Invention | AF-68 | — | HCL-24 | LL-15 |
| Invention | AF-69 | — | HCL-1 | LL-1 |
| Invention | AF-70 | — | HCL-1 | LL-16 |

Evaluation of Antireflection Film (AF):

Each film obtained was evaluated in the same manner as in Example 1, and the film samples using the same coating solution showed the same results

EXAMPLE 3

Manufacture of Protective Film for Polarizing Plate:

In antireflection films (AF-1) to (AF-24), (AF-26) to (AF-49) and (AF-51) to (AF-70) manufactured in Examples 1 and 2, the surface of each transparent support was saponification-treated by coating an alkali solution comprising 57 mass parts of potassium hydroxide, 120 mass parts of propylene glycol, 535 mass parts of isopropyl alcohol, and 288 mass parts of water maintained at 40° C. on the surface of the transparent support of the side opposite to the side having an antireflection layer.

The alkali solution on the surface of the transparent support subjected to saponification treatment was thoroughly washed with water, and the film was sufficiently dried at 1 00° C., whereby a protective film for a polarizing plate was obtained.

Manufacture of Polarizing Plate:

A polyvinyl alcohol film having a thickness of 75 μm (manufactured by Kuraray Co., Ltd.) was immersed for 5 minutes in an aqueous solution comprising 1,000 g of water, 7 g of iodine and 10.5 g of potassium iodide to adsorb iodine onto the film. In the next place, the film was uniaxially stretched 4.4 times in perpendicular direction in a 4 mass % aqueous solution of boric acid, and dried while maintaining a state of tension to prepare a polarizer.

Subsequently, the saponification-treated triacetyl cellulose surface of each antireflection film (a protective film for a polarizing plate) of the invention was stuck on one side of the polarizer with a polyvinyl alcohol adhesive. Further, a similarly saponification-treated triacetyl cellulose film (TD80UF, manufactured by Fuji Photo Film Co., Ltd.) was stuck on the other side of the polarizer with the same adhesive.

Evaluation of Image Display Device:

Each of the thus-prepared polarizing plates of the invention was mounted on a transmission type, a reflection type, or a semi-transmission type liquid crystal display of TN, STN, EPS, VA, OCB and ECB modes and evaluated. Every liquid crystal display was excellent in antireflection property, and visibility was extraordinarily excellent.

EXAMPLE 4

Manufacture of Polarizing Plate:

The surface of the side opposite to the side having an optical compensation layer of an optical compensation film "Wide View Film A 12B (manufactured by Fuji Photo Film Co., Ltd.) was subjected to saponification treatment in the same manner as in Example 3.

Subsequently, the saponification-treated triacetyl cellulose surface of each antireflection film (a protective film for a polarizing plate) prepared in Example 3 was stuck on one side of the polarizer with a polyvinyl alcohol adhesive. Further, a triacetyl cellulose surface of saponification-treated optical compensation film was stuck on the other side of the polarizer with the same adhesive.

Evaluation of Image Display Device:

Each of the thus-prepared polarizing plates of the invention was mounted on a transmission type, a reflection type, or a semi-transmission type liquid crystal display of TN, STN, IPS, VA, OCB and ECB modes and evaluated. Every liquid crystal display was excellent in contrast in a bright room, the angle of visibility of up and down and left and right was very wide, further, antireflection property, visibility, and display quality were extremely excellent.

EXAMPLE 5

Polarizing plates were manufactured with the following supports.

Support 1: A triacetyl cellulose film manufactured according to JP-A-2001-249223, Example 1
Support 2: A triacetyl cellulose film manufactured according to JP-A-2001-249223, Example 2
Support 3: A triacetyl cellulose film manufactured according to JP-A-2003-170492, Example 2
Support 4: A triacetyl cellulose films FUJI TAC-TD80U having a thickness of 80 μm (manufactured by Fuji Photo Film Co., Ltd.)

The retardation value of each sample is shown below.
Support 1: Re =40 nm, Rth =130 nm
Support 2: Re =50 nm, Rth =240 nm
Support 3: Re =64 nm, Rth =120 nm
Support 4: Re =4 nm, Rth =45 nm Manufacture of Polarizing Plate (P-1):

Polarizer (PF-1) was manufactured by adsorbing iodine onto a stretched polyvinyl alcohol film. In the first place, a commercially available triacetyl cellulose film (support 4) was subjected to saponification treatment, and stuck on one side of polarizer (PF-1) with a polyvinyl alcohol adhesive. After that, the above support 1 was subjected to saponification treatment, and stuck on the other side of polarizer (PF-1) with a polyvinyl alcohol adhesive. At that time, the transmission axis of polarizer (PF-1) and the retardation axis of support 1 were disposed in parallel, and the transmission axis of polarizer (PF-1) and the retardation axis of commercially available triacetyl cellulose film (support 4) were disposed in orthogonal, respectively, to prepare a polarizing plate (P-1).

Manufacture of Polarizing Plate (P-2):
Polarizing plate (P-2) was prepared in the same manner as in the preparation of polarizing plate (P-1), except for using support 1 in place of support 4.

Manufacture of Polarizing Plate (P-3):
Polarizing plate (P-3) was prepared in the same manner as in the preparation of polarizing plate (P-1), except for using support 2 in place of support 4.

Manufacture of Polarizing Plate (P-4):
Polarizing plate (P-4) was prepared in the same manner as in the preparation of polarizing plate (P-1), except for using support 3 in place of support 4.

Manufacture of Polarizing Plate (P-1A):
Polarizing plate (P-1A) was prepared in the same manner as in the preparation of polarizing plate (P-1), except for using antireflection film sample AF-3 in Example 1 in place of support 4.

Manufacture of Polarizing Plate (P-2A):
Polarizing plate (P-2A) was prepared in the same manner as in the preparation of polarizing plate (P-2), except for using antireflection film sample AF-18 in Example 2 in place of support 4.

Manufacture of Polarizing Plate (P-3A):
Polarizing plate (P-3A) was prepared in the same manner as in the preparation of polarizing plate (P-2), except for using antireflection film sample AF-23 in Example 2 in place of support 4.

Manufacture of Polarizing Plate (P-1B):
Polarizing plate (P-1B) was prepared in the same manner as in the preparation of polarizing plate (P-1), except for using antireflection film sample AF-54 in Example 1 in place of support 4.

Manufacture of Polarizing Plate (P-2B):
Polarizing plate (P-2B) was prepared in the same manner as in the preparation of polarizing plate (P-2), except for using antireflection film sample AF-64 in Example 2 in place of support 4.

Manufacture of Polarizing Plate (P-3B):
Polarizing plate (P-3B) was prepared in the same manner as in the preparation of polarizing plate (P-2), except for using antireflection film sample AF-65 in Example 2 in place of support 4.

EXAMPLE 6

A pair of polarizing plates and a pair of optical compensation sheets provided in a liquid crystal display "VL-1530S" (manufactured by Fujitsu Limited) using a perpendicular orientation liquid crystal cell were taken off, and the polarizing plate prepared in Example 5 was stuck with an adhesive one on the observer side and one on the back light side in return. Crossed nicols arrangement was taken so that the transmission axis of the observer side polarizing plate be up and down direction and the transmission axis of the back light side polarizing plate be left and right direction. With the manufactured liquid crystal display, image was displayed, and mirroring of the reflection of outer light and background, and glaringness were evaluated.

As a result, it was found that, as compared with devices having polarizing plates (P-1) to (P-4), devices having polarizing plates of the invention (P-1A) to (P-3A) and (P-1B) to (P-3B) were reduced in reflectance, mirroring of the reflection of outer light and background is less, not accompanied with the occurrence of glaringness, and visibility was extremely high.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-128219 filed Apr. 26 of 2005, the contents of which are incorporated herein by reference.

What is claimed is:

1. An antireflection film comprising: a transparent support; a hard coat layer; and an antireflection layer in this order, wherein the hard coat layer is a cured film formed from a curable composition comprising: a resin composition curable upon at least one of heating and ionizing radiation; a compound comprising a fluoro-aliphatic group-containing monomer represented by formula (3):

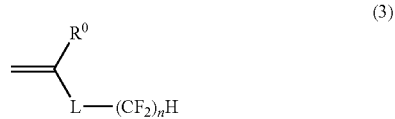

wherein $R^0$ represents a hydrogen atom, a halogen atom, or a methyl group; L represents a divalent linking group; and n represents an integer of 1 to 18; and at least one of a silane coupling agent represented by formula (1), a hydrolyzed product of the silane coupling agent and a condensation reaction product of the hydrolyzed product, and the antireflection layer is a cured film obtained by curing a curable composition upon at least one of heating and ionizing radiation, wherein the curable composition comprises:

(A) at least one of a hydrolyzed product of organosilane and a condensation reaction product of the hydrolyzed product, the at least one of the hydrolyzed product and the condensation reaction product having a weight average molecular weight of 500 to 10,000 in terms of ethylene glycol:

(B) a fluorine-containing resin having a weight average molecular weight of 5,000 or more in terms of polystyrene and having a fluoroalkyl structure and a polysiloxane structure; and (C) at least one of a silane coupling agent represented by formula (1), a hydrolyzed product of the silane coupling agent and a condensation reaction product of the hydrolyzed product:

$$(R^a)_m\text{-Si}(X^a)_{4-m} \quad (1)$$

wherein $X^a$ represents a hydroxyl group or a group capable of hydrolysis; $R^a$ represents a substituent having at least one of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, and an acylamino group; and m is an integer of 1 to 3.

2. The antireflection film according to claim 1, wherein the curable composition for forming the hard coat layer comprises a leveling agent.

3. The antireflection film according to claim 2, wherein the leveling agent is at least one of a fluorine compound and a silicone compound.

4. The antireflection film according to claim 1, which has a photoelectron spectral intensity ratio Si/C at an outermost surface of 2 times or more than that at an 80% lower layer from the outermost surface.

5. The antireflection film according to claim 1, which has a haze attributable to surface light scattering of 3% or less and a glossiness at 60° of 60 to 120%.

6. The antireflection film according to claim 1, which has a haze attributable to surface light scattering of 3.5% or more and a glossiness at 60° of 20 to 80%.

7. The antireflection film according to claim 1, which comprises a transparent antistatic layer comprising an electrically conductive material, wherein the antireflection film has a surface resistance value logSR of 12 or less.

8. The antireflection film according to claim 1, wherein a critical load of a surface of the antireflection film in a rubbing test with a cotton swab after exposure to ozone of 10 ppm for 192 hours is 400 g or more.

9. A polarizing plate comprising: a polarizer; and two protective films, wherein at least one of the two protective films is an antireflection film according to claim 1.

10. A polarizing plate comprising: a polarizer; and two protective films, wherein one of the two protective films is an antireflection film according to claim 1, and the other of the two protective films is an optical compensation film having an optical anisotropy.

11. An image display device comprising an antireflection film according to claim 1 disposed on an image screen of the image display device.

12. The image display device according to claim 11, which is one of a transmission, reflection and semi-transmission liquid crystal displays in one mode of TN, STN, IPS, VA, OCB and ECB modes.

* * * * *